United States Patent
Speer et al.

(10) Patent No.: US 12,540,383 B2
(45) Date of Patent: Feb. 3, 2026

(54) MODIFIED HOT-DIP GALVANIZE COATINGS WITH LOW LIQUIDUS TEMPERATURE, METHODS OF MAKING AND USING THE SAME

(71) Applicant: Colorado School of Mines, Golden, CO (US)

(72) Inventors: John Speer, Littleton, CO (US); Lijia Zhao, Golden, CO (US)

(73) Assignee: Colorado School of Mines, Golden, CO (US)

( * ) Notice: Subject to any disclaimer, the term of this patent is extended or adjusted under 35 U.S.C. 154(b) by 361 days.

(21) Appl. No.: 18/231,060

(22) Filed: Aug. 7, 2023

(65) Prior Publication Data

US 2024/0002994 A1 Jan. 4, 2024

Related U.S. Application Data

(62) Division of application No. 16/324,251, filed as application No. PCT/US2017/045858 on Aug. 8, 2017, now abandoned.

(60) Provisional application No. 62/372,193, filed on Aug. 8, 2016.

(51) Int. Cl.
| | | |
|---|---|---|
| *C23C 2/28* | (2006.01) | |
| *C21D 1/20* | (2006.01) | |
| *C21D 1/22* | (2006.01) | |
| *C22C 18/04* | (2006.01) | |
| *C23C 2/06* | (2006.01) | |

(52) U.S. Cl.
CPC .................. *C23C 2/28* (2013.01); *C21D 1/20* (2013.01); *C21D 1/22* (2013.01); *C22C 18/04* (2013.01); *C23C 2/06* (2013.01); *C23C 2/29* (2022.08); *C21D 2211/002* (2013.01); *C21D 2211/008* (2013.01)

(58) Field of Classification Search
None
See application file for complete search history.

(56) References Cited

U.S. PATENT DOCUMENTS

| | | |
|---|---|---|
| 3,993,482 A | 11/1976 | Brunno |
| 2009/0297881 A1 | 12/2009 | Maalman et al. |
| 2010/0139816 A1 | 6/2010 | Hanlon et al. |
| 2013/0192726 A1 | 8/2013 | Chen et al. |
| 2015/0231726 A1 | 8/2015 | Hosomi et al. |
| 2015/0284861 A1 | 10/2015 | Allely et al. |
| 2015/0368778 A1 | 12/2015 | Allely et al. |
| 2016/0312323 A1 | 10/2016 | Rana et al. |
| 2018/0002799 A1 | 1/2018 | Futamura et al. |
| 2018/0209011 A1 | 7/2018 | Denks et al. |
| 2021/0180172 A1 | 6/2021 | Speer et al. |

FOREIGN PATENT DOCUMENTS

| | | |
|---|---|---|
| CN | 101787494 | 7/2010 |
| CN | 101942600 | 1/2011 |
| CN | 102304664 | 1/2012 |
| CN | 102534406 | 7/2012 |
| CN | 103103438 | 5/2013 |
| CN | 103695765 | 4/2014 |
| DE | 202015104790 | 12/2015 |
| EP | 0594520 | 4/1994 |
| EP | 1621645 | 2/2006 |
| EP | 2862662 | 4/2015 |
| JP | S46-003644 | 1/1971 |
| JP | H02-175852 | 7/1990 |
| JP | H10-226865 | 8/1998 |
| JP | 2001-207249 | 7/2001 |
| JP | 2001-329355 | 11/2001 |
| JP | 2001-355052 | 12/2001 |
| JP | 2005-350689 | 12/2005 |
| JP | 2008-504440 | 2/2008 |
| JP | 2015-531817 | 11/2015 |
| JP | 2016-050343 | 4/2016 |
| JP | 2016-130357 | 7/2016 |
| KR | 10-2015-0074975 | 7/2015 |
| WO | WO 2006/002843 | 1/2006 |
| WO | WO 2012/141659 | 10/2012 |
| WO | WO 2014/112594 | 7/2014 |
| WO | WO 2014/122507 | 8/2014 |
| WO | WO 2015/090621 | 6/2015 |
| WO | WO 2016/001887 | 1/2016 |

OTHER PUBLICATIONS

Official Action for Canada Patent Application No. 3033387, dated Aug. 21, 2023, 3 pages.
Intent to Grant Europe Patent Application No. 17840131.1, dated Sep. 19, 2023, 54 pages.
"ArcelorMitall Steel Specification," Magnelis, 2014, retrieved from https://industry.arcelormittal.com/repository2/architect_envelope/EN%20Steel%20Specification.pdf, 36 pages.
Aoki et al., "Result of 10-Year Atmospheric Corrosion Testing of Hot-Dip Zn-5 mass%Al Alloy Coated Steel Sheet," Galvatech '95 Conference Proceedings, Sep. 17-21, 1995, pp. 463-468.
Azevedo, "Mécanismes de corrosion de l'acier revêtu d'alliage à base de ZnMgAl en tests accélérés et en environnement naturel," Université Pierre et Marie Curie, Apr. 29, 2014, 209 pages.
Bakhtiari et al., "The Effect of Zinc Bath Temperature on the Morphology, Texture and Corrosion Behaviour of Industrially Produced Hot-Dip Galvanized Coatings," Metallurgical and Materials Engineering, vol. 20, No. 1, 2014, pp. 41-52.
Carson et al., "Continuous Annealing and Hot forming of a Medium Manganese Steel," ASPRC Fall Report Chapter 12, 2014, 14-1-14-14.

(Continued)

*Primary Examiner* — Anthony M Liang
(74) *Attorney, Agent, or Firm* — Sheridan Ross P.C.

(57) ABSTRACT

A metallic material with a first microstructure is coated in a bath with a coating to form a coated metallic material. The coating has a liquidus temperature and the bath has an operating temperature that is higher than the liquidus temperature. The first microstructure of the metallic material is altered by the application of the coating to an alternative microstructure. The coating includes a dopant which acts as a temperature reducing agent.

14 Claims, 16 Drawing Sheets

(56) References Cited

OTHER PUBLICATIONS

Fan et al., "Review of the Physical Metallurgy Related to Hot Press Forming of Advanced High Strength Steel," Steel Research International, 2009, vol. 80(3), pp. 241-248.
Ghanbari et al., "Zinc Coated Sheet Steel for Press Hardening," ASPPRC Spring Report Chapter 10, 2012, 10.1-10.8.
Karbasian et al., "A Review on Hot Stamping," Journal of Materials Processing Technology, 2010, vol. 210(15), pp. 2103-2118, abstract only, 1 page.
Liang et al., "Experimental investigation and thermodynamic calculation of the Al—Mg—Zn system," Thermochimica Acta, vol. 314, No. 1-2, Apr. 27, 1998, pp. 87-110, abstract only.
Liu et al., "Enhanced mechanical properties of a hot stamped advanced high strength steel treated by quenching and partitioning process," Scripta Materialia, 2011, vol. 64, pp. 749-752.
Rana et al., "Continuous Annealing and Hot Forming of a Medium Manganese Steel," ASPRC and the CSM Undergraduate Research Fellowship Program, 2014, 15 pages.
Seo et al., "Application of quenching and partitioning (Q&P) processing to press hardening steel," Metallurgical and Materials Transactions A, 2014, vol. 45, pp. 4022-4037.
Shimizu et al., "Corrosion Products of Hot-dip Zn-6%Al-3%Mg Coated Steel Sheet Subjected to Atmospheric Exposure," ISIJ International, vol. 89, No. 1, 2003, pp. 166-173 (with English abstract).
Speer et al., Highlights of recent progress in automotive sheet steel development, Baosteel BAC, conference paper, 2013, E-59-E65.
Zhao, "Thermodynamic Calculation of Zinc-alloy Systems for Hot-dip Galvanizing: Discussion with Prof. Speer," Colorado School of Mines, Jun. 17, 2016, 17 pages.
International Search Report and Written Opinion prepared by the ISA/US on Nov. 20, 2017, for International Application No. PCT/US2017/045858.
International Preliminary Report on Patentability for International (PCT) Application No. PCT/US2017/045858, dated Feb. 21, 2019, 23 pages.
Extended European Search Report for European Patent Application No. 17840131.1, dated May 26, 2020, 9 pages.
Communication Pursuant to Article 94(3) for Europe Patent Application No. 17840131.1, dated Apr. 23, 2021, 7 pages.
Communication Pursuant to Article 94(3) for Europe Patent Application No. 17840131.1, dated Jul. 15, 2022, 6 pages.
Intent to Grant Europe Patent Application No. 17840131.1, dated Mar. 30, 2023, 54 pages.
Official Action (with English translation) for Japan Patent Application No. 2019-529139, dated Aug. 17, 2021, 9 pages.
Official Action (with English translation) for Japan Patent Application No. 2019-529139, dated Jun. 21, 2022, 16 pages.
Decision to Grant (with English translation) for Japan Patent Application No. 2019-529139, dated Mar. 7, 2023, 4 pages.
Official Action for U.S. Appl. No. 15/136,681, dated Jul. 17, 2018, 9 pages.
Official Action for U.S. Appl. No. 16/324,251, dated Jun. 28, 2021, 10 pages. Restriction Requirement.
Official Action for U.S. Appl. No. 16/324,251, dated Oct. 14, 2021, 12 pages.
Official Action for U.S. Appl. No. 16/324,251, dated Apr. 22, 2022, 10 pages.
Official Action for U.S. Appl. No. 16/324,251, dated Mar. 6, 2023, 12 pages.
Official Action for Canada Patent Application No. 3033387, dated Feb. 6, 2024, 3 pages.

MODIFIED HOT-DIP GALVANIZE COATINGS WITH LOW LIQUIDUS TEMPERATURE, METHODS OF MAKING AND USING THE SAME

CROSS REFERENCE TO RELATED APPLICATIONS

This application is a divisional of U.S. patent application Ser. No. 16/324,251 filed on Feb. 8, 2019, which is a national stage application under 35 U.S.C. 371 of PCT Application No. PCT/US2017/045858 having an international filing date of Aug. 8, 2017, which designated the United States, which PCT application claimed the benefit of U.S. Provisional Patent Application Ser. No. 62/372,193 filed on Aug. 8, 2016, the disclosures of each of which are incorporated herein by reference in their entireties.

FIELD OF THE INVENTION

The present invention involves lower liquidus temperature coatings to enhance substrate responses in a variety of applications, and processes for making and using the same.

BACKGROUND

Zinc coatings are applied to steel and steel alloys, both in batch and continuous processing, to provide corrosion protection. While electroplating is sometimes used, more often the coating is applied by dipping the steel substrate into a molten metallic bath, thereby exposing the steel substrate to thermal histories controlled by the melting temperature of the metallic coating. These thermal histories influence the substrate metallurgy, sometimes affecting product properties in a deleterious manner, for example, carbon aging the substrate material. Furthermore, zinc coatings that require high temperature baths inhibit substantial formation of martensite or bainite, and therefore require additional processing to form these microstructures, in steels where their formation is possible.

SUMMARY

Lower bath temperatures in some instances would enable processing to enhance properties. The present invention enhances quench and partitioning for hot-dip coated processing. Quenching in a zinc bath is difficult as quench temperatures lower than the melting point of zinc are required. Lower bath temperatures can eliminate the need for capital modification to control quenching temperature, and might also allow different control of partitioning.

Lower bath temperatures would also enable austempering at lower temperatures. Thus, an aspect of the invention is an alloy coating with lower melting points than previously envisioned and currently available for steels.

Lower bath temperatures can diminish undesirable effects due to carbon aging, which could enhance properties in numerous applications including sheet steel, high strength galvanized wire, and other steels. Another method, heat to coat galvanizing of batch annealed low-carbon steels, was replaced by in-line annealed continuous coating of aging-resistant interstitial free steels. Lower melting alloys could allow alternative grades and processing for such applications to reduce cost.

Dual phase sheet steels usually undergo transformation to martensite after the zinc bath. Furthermore, bath temperatures are too high for effective martensite tempering due to the associated softening. Lowering of the melting temperature can allow control of martensite tempering to enhance ductility without overly compromising strength.

Typically, the liquidus temperature for a coating is above the melting temperature of zinc (i.e. 419.5° C.). While the quenching temperature to form microstructures (like martensite or bainite) will depend upon the particular steel, the steel must be quenched at low temperatures, typically below about 419° C., in order to form a martensitic microstructure, or a finer bainitic microstructure than is achieved in conventional hot-dip galvanizing. Thus, a steel requiring coating and a change in the microstructure would require multiple steps to achieve a suitable coated steel.

The present invention allows for a steel to be subjected to quenching to form a microstructure, while coating the substrate in the same step, or to form a finer microstructure (due to the lower temperature) while coating. The present invention uses a coating with a liquidus temperature below about 419° C. so that the quenching and coating steps can occur simultaneously. The quenching temperature will affect the microstructure of the steel alloy. The quenching (austempering) temperature can be chosen to form a particular microstructure, such as martensite (bainite), or a combination of martensite and bainite. In order for coating process to work as a heat treatment to form the microstructure and to coat the substrate with the coating material in its liquid state, the quenching temperature, which is critical to the present invention, must be higher than the liquidus temperature of the coating.

One aspect of the invention is an alloyed material. The alloyed material includes a coating or temperature reducing agent. The coating or temperature reducing agent includes a metal material and a temperature reducing agent. The temperature reducing agent can include Sn, Li, Ga and/or In. The alloyed material has wide applicability. It can be used as a coating, in welding, for corrosion resistance, or to maintain a surface quality, to name a few examples.

An aspect of the invention is a new coating composition. The coating can include a zinc-based alloy and a second material, which can be a dopant.

An aspect of the invention is the use of a coating at a lower temperature than typically used in a galvanizing process. In other words, the use of a coating which has a lower liquidus temperature.

An aspect of the invention is a method to reduce the liquidus temperature of a metallic material. The method includes providing a metal material, then coating the metal material with a zinc-based alloy material and a dopant.

An aspect of the present invention is a method to coat a metallic material at low temperature. The method includes providing a metallic material, then coating the metallic material with a zinc-based alloy coating. The zinc-based alloy material includes a doping material, and the liquidus temperature of the zinc-based alloy material with the doping material is less than the liquidus temperature of the zinc-based alloy material without the doping material.

An aspect of the invention is a coated substrate alloy. The coated substrate alloy includes a metallic material coated with a zinc-based alloy coating. The zinc-based alloy coating includes a metal alloy material, and at least one dopant. The liquidus temperature of the zinc-based alloy coating is less than about 419° C.

An aspect of the invention is a binary zinc alloy. The binary zinc alloy includes zinc and a second material. The mass fraction of the second material is at most about 70%, and the mass fraction of the zinc is at least about 30%.

An aspect of the invention is a method to reduce a liquidus temperature of a zinc-based alloy coating for galvanizing. The method includes combining a zinc-based alloy with a dopant. The dopant is selected from the group consisting of aluminum, magnesium, copper, titanium, antimony, silicon, bismuth, gallium, indium, tin, lead, lithium, potassium or combinations thereof.

An aspect of the invention is a method of producing a coated steel part. The method includes providing a liquid coating where the liquidus temperature of the coating is less than a quenching temperature required to form an alternative microstructure in the steel. The alternative microstructure is a change in at least one of martensite tempering, bainite tempering, or carbon aging of the steel. The steel is coated with the coating and the alternative microstructure is formed in the steel during coating.

An aspect of the invention is a coated steel. The coated steel includes a steel substrate. The steel substrate includes an alternative microstructure formed by altering a first microstructure in the steel substrate. The alternative microstructure is formed during a coating process. The coated steel also includes a coating on at least a portion of the steel substrate.

DETAILED DESCRIPTION

Figure 1:
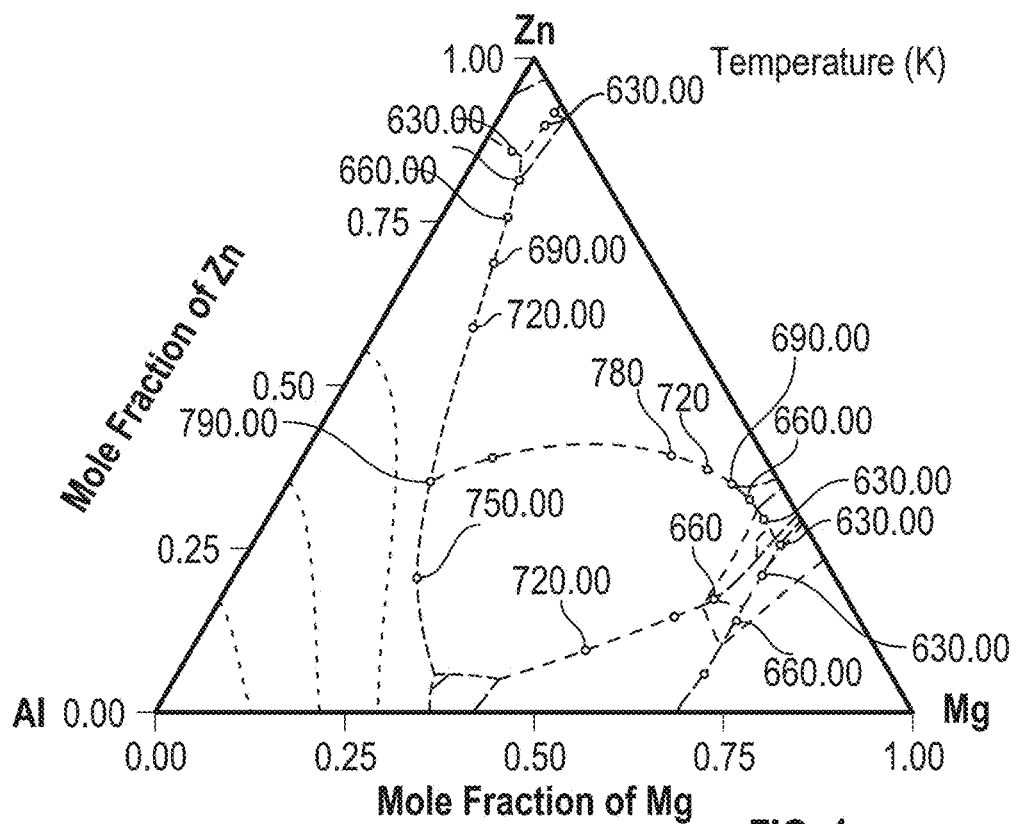
FIG. 1 illustrates a ternary graph of zinc-aluminum-magnesium system at different mole fractions made using Thermo-Calc Software.

The present invention relates to zinc-based alloy coatings, which can be applied to substrates at lower temperatures than traditional zinc-based coatings. The present invention also relates a method of making the zinc-based alloy coatings, and a method to use the coatings.

The present invention has been illustrated using a constant alloying amount of a quaternary system of Zn-3.9Al-2.45Mg-x (where x is the added material to lower the liquidus temperature). However, it is possible to vary the amounts of each material without deviating from the invention.

For each aspect and embodiment of the present invention, the zinc-based alloy coatings and the zinc-based alloys can include incidental materials or impurities without deviating from the invention.

Definitions

"Liquidus temperature" is the lowest temperature where the alloy is fully liquid. The alloy will start to become solid below this temperature. While the invention can be used at temperatures above the liquidus temperature, advantages, such as the formation of microstructures, can be achieved by utilizing the lowest liquidus temperature possible for a given coating.

"Eutectic temperature" is the temperature at which a particular low melting point for a binary eutectic mixture melts/solidifies. The eutectic temperature is the lowest possible melting temperature over all of the mixing ratios for the involved components.

"Melting temperature" represents the temperature at which melting begins.

Coatings can be applied at an "operating temperature," which can be at a temperature greater than the liquidus temperature so that the coating remains as a liquid even after the substrate is dipped into the coating bath. The operating temperature can be up to about 50 degrees higher than the liquidus temperature (e.g. if the liquidus temperature was about 123° C., then the operating temperature can be between about 123° C. and about 173° C.). In some embodiments, the operating temperature can be between about degrees to about 45 degrees hotter than the liquidus temperature for a coating. In some embodiments, the operating temperature can be greater than the liquidus temperature (i.e. hotter) by about 0°, about 5°, about 10°, about 15°, about 20°, about 25°, about 30°, about about 40°, about 45°, or about 50°. The operating temperature is critical to the success of the invention in forming an alternative microstructure while coating the substrate. If the operating temperature is too low, then the coating will not remain in liquid form (i.e. cannot coat the substrate). If the operating temperature is too hot, then it will not provide an adequate quenching temperature for forming the alternative microstructure. Thus, several factors must be considered when determining the operating temperature. Furthermore, it becomes clear that the operating temperature is selected with consideration of both the particular coating, and the particular substrate material.

The "quenching temperature" is the temperature for a particular alloy where a microstructure is formed or altered. The microstructure can be, for example, martensite, bainite, ferrite or a combination thereof. Martensite forms immediately upon cooling, while bainite occurs over time. The quenching temperature and subsequent coating process also relates to an "austempering" temperature wherein bainite can form. The quenching temperature is above the liquidus temperature for a particular coating so that exposure of the substrate to the quenching temperature results in both the formation of at least one quenched microstructure, and coating of the steel. If an alternative quenched microstructure is desired in the substrate, then the operating temperature can be the quenching temperature. The quenching temperature can be +/− about 20 degrees of the temperature required to form the microstructure. In some embodiments, the quenching temperature can be within the temperature required to form the microstructure by about 1°, about 5°, about 8°, about 10°, about 12°, about 15°, or about 20°. In some embodiments, the quenching temperature can be within about 5° to about 10° of the temperature required to form the microstructure. In some embodiments, the substrate can be exposed to the quenching temperature for a time sufficient to form a microstructure or alternative microstructure. In some embodiments, the time is sufficient to begin a perpetuating reaction. In some embodiments, the substrate is exposed to the temperature for a sufficient time for the part to reach an equilibrium temperature. One skilled in the art would understand that the exposure time is dependent upon the temperature and time required for the reaction to result in the desired microstructure or alternative microstructure.

In some embodiments, the quenching temperature can be sufficiently low enough to prevent damages to the microstructure because the microstructure is not subjected to high temperatures required by traditional galvanizing methods.

An "alternative microstructure" or "alternative quenched microstructure" are related to changes in carbon aging microstructures of steels containing ferrite including tempering or formation of martensite, modification of austempered bainite, or combinations thereof. Carbon aging and modifications to martensite or bainite microstructures are each dependent upon the quenching temperature of substrate containing ferrite, martensite, or bainite, respectively. Thus, one can alter a microstructure in the ferrite, martensite or bainite by subjecting a substrate with one or more of these microstructures to one or more quenching temperatures corresponding to a desired microstructure (i.e. the alternative microstructure).

An aspect of the present invention is a method to coat a metallic material at an operating temperature. The method includes providing a metallic material, then coating the metallic material with a zinc-based alloy coating. The zinc-based alloy coating includes a zinc-based alloy material and a doping material. The liquidus temperature of the zinc-based alloy coating (i.e. the zinc-based alloy material with the doping material) is less than the liquidus temperature of the zinc-based alloy material without the doping material.

The melting temperature or liquidus temperature of the zinc-based alloy material without the dopant can be determined either by undue experimentation or by literature searching. For example, the melting temperature of pure zinc is about 419.5° C. The liquidus temperature of a Zn—Al—Mg alloy is about 344.5° C., which can be determined with a ternary phase diagram as explained in Example 3 below generated with experimentation or using software programs, or literature searching. A material discussed earlier is Zn-3.9Al-2.45Mg. The liquidus temperature of this material is 344.5° C. The melting temperature and liquidus temperature of a particular zinc-based alloy coating will depend upon the composition of the coating.

Figure 19:
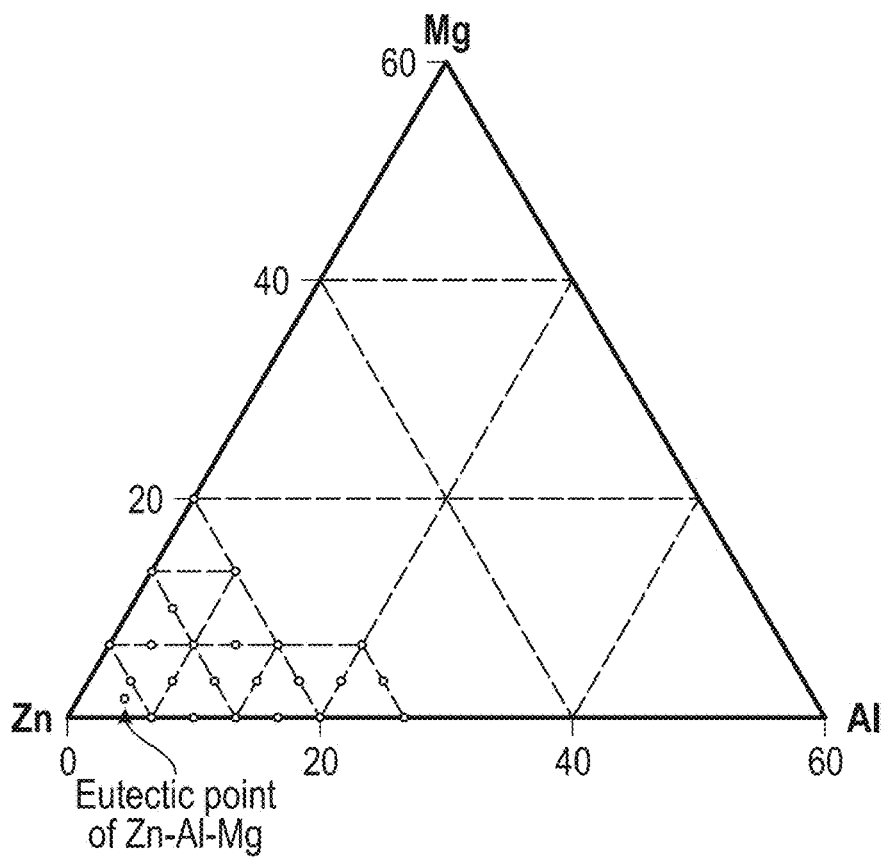
FIG. 19 illustrates a ternary diagram used to determine the liquidus temperature of quaternary Zn—Al—Mg-dopant systems.

The zinc-based alloy material can be pure zinc, a binary composition, a ternary composition, a quaternary composition, or a "n-ary" composition. In some embodiments, the zinc-based alloy material can include, but are not limited to, zinc-aluminum, zinc-aluminum-magnesium, zinc-magnesium, zinc-element(s), or other zinc based alloy material. Zinc based material useful for the invention have a liquidus temperature that is less than the melting temperature of zinc. The zinc-based alloy material can be used as a coating. In some embodiments, the doping material is combined with the zinc-based material to form the zinc-based alloy coating, which can be a ternary, quaternary, or "p"-ary (where "p" can be between 2 and "n"+2) material. The doping material(s) (also referred to as the temperature reducing agent) can be magnesium, tin, lithium, gallium, indium, copper, titanium, antimony, silicon, bismuth, lead, or potassium. The mass fraction of the dopant can be chosen to reduce the liquidus temperature. FIG. 19 illustrates a ternary diagram used to determine the liquidus temperature of quaternary Zn—Al—Mg-dopant systems. Example 3 provides a method to determine an appropriate mass fraction of the dopant(s). By way of non-limiting example, suitable zinc-based alloy coatings (i.e. zinc-based alloy material with the doping material) can include Zn-aAl-bMg-dopant, Zn-bMg-(x)dopant, Zn-aAl-(x)dopant, Zn-aAl-bMg-(x)dopant$_1$-(y)dopant$_2$, Zn-bMg-(x)dopant$_1$-(y)dopant$_2$, Zn-aAl-(x)dopant$_1$-(y)dopant$_2$, Zn-3.9Al-2.45Mg-(x)dopant, Zn-3.9Al-2.45Mg-(x)dopant$_1$-(y)dopant$_2$. Each of the coefficients (i.e. "a", "b", "x", or "y") can be selected so that liquidus temperature is less than the melting temperature of zinc. In some embodiments, the general formula for the zinc-based alloy coating comprising aluminum, "a" can be between 0 and 20. In some embodiments, "a" can be between 3.35 and 30. In some embodiments, "a" can be between 3.9 and 16.75. In some embodiments, "a" can be between 6.7 and 20. In some embodiments, "a" can be 0, 1, 2, 3, 3.35, 3.9, 4, 6, 6.7, 7, 8, 10, 10.05, 12, 13.4, 15, 16.75, or 20. For magnesium, in some embodiments, "b" can be between 0 and 20. In some embodiments, "b" can be between about 0 and 6.7. In some embodiments, "b" can be 0, 1, 2, 2.5, 3, 3.35, 4, or 6.7. For the dopant, in some embodiments, "x" can be between 0 and 40. In some embodiments, "x" can be between 1 and 20. In some embodiments, "x" can be between 1 and 10. Similarly, when a second or additional dopants are used, in some embodiments, each of the coefficients preceding the specific dopant can be between 0 and 40, between 1 and 20, or between 1 and 10.

The mass fraction of aluminum in the zinc-based alloy coatings can be less than about 20%. In some embodiments, the mass fraction of aluminum in the zinc-based alloy coating can be between about 3.35% and about 13.4%. In some embodiments, the mass fraction of aluminum in the zinc-based alloy coating can be greater than about 6.7% and less than about 20%. The mass fraction of magnesium in the zinc-based alloy coating can be less than about 10.05%. In some embodiments, the mass fraction of magnesium in the zinc-based alloy coating can be between about 0% and about 20%. The mass fraction of a dopant in the zinc-based alloy coating can be less than about 60%. In some embodiments, the mass fraction of the dopant in the zinc-based alloy coating can be between about 7.5% and about 12%. In some embodiments of the invention, the mass fraction of the dopant can be between about 1% and about 30%. When more than one dopant is used in the zinc-based alloy coating, the total mass fraction of the second to additional nth dopant in the reduced temperature coatings can be between about 0% and about 60%. In some embodiments, the total mass fraction of the additional dopant can be between about 1% and about 30%.

The resulting zinc-based alloy coating can have a liquidus temperatures that can be less than the melting temperature of zinc (i.e. about 419° C.). The liquidus temperature of the zinc-based alloy coating can be between about 275° C. and about 419° C. In some embodiments, the liquidus temperature of the zinc-based alloy coating can be between about 279° C. and about 365° C.

The metallic material can be a steel or steel alloy. Suitable steel alloy materials include, but are not limited to, steel sheets, strips, bars, rods, pipes, wires, reinforced bars, plates, hardware (for example fasteners), and combinations thereof. In particular, the present invention can be used with the broad class of sheet steel alloys.

The zinc-based alloy coating can be applied to the metallic material by dipping or spraying. The zinc-based alloy coating can be heated to an operating temperature, which is above the melting temperature or the liquidus temperature to liquify the zinc-based alloy coating prior to application. The zinc-based alloy coating can be applied at any thickness suitable for a particular application as set forth in ASTMs, such as for example ASTM A123/A123M. In some embodiments, the thickness of the coating can be applied to between about 5 microns and about 200 microns.

The surface of the metallic material can be treated to increase adhesion of the coating to the substrate. The surface treatment can include, for example, cleaning, etching, mechanical abrasion, or chemical etching. The surface treatment can increase the surface area of the substrate.

An aspect of the invention is a coated substrate alloy. The coated substrate alloy includes a metallic material coated with a zinc-based alloy coating. The zinc-based alloy coating includes a zinc-based alloy material, and at least one dopant. The liquidus temperature of the zinc-based alloy coating is less than 419° C.

The substrate is a metallic material. The metallic material can be a steel or steel alloy. Suitable steel alloy materials include, but are not limited to, steel sheets, strips, bars, rods, pipes, wires, reinforced bars, plates, hardware (for example fasteners). In particular, the present invention can be used with the broad class of sheet steel alloys.

The melting temperature or liquidus temperature of the zinc-based alloy material without the dopant can be determined either by undue experimentation or by literature searching. For example, the melting temperature of pure zinc is about 419.5° C. The liquidus temperature of a Zn—Al—Mg alloy is about 344.5° C., which can be determined with a ternary phase diagram as explained in Example 3 below generated with experimentation or using software programs, or literature searching. A material discussed earlier is Zn-3.9Al-2.45Mg. The liquidus temperature of this material is 344.5° C. The melting temperature and liquidus temperature of a particular zinc-based alloy coating will depend upon the composition of the coating.

The zinc-based alloy material can be pure zinc, a binary composition, a ternary composition, a quaternary composition, or a "n-ary" composition. In some embodiments, the zinc-based alloy material can include, but are not limited to, zinc-aluminum, zinc-aluminum-magnesium, zinc-magnesium, zinc-element(s), or other zinc based alloy material. Zinc based material useful for the invention have a liquidus temperature that is less than the melting temperature of zinc. The zinc-based alloy material can be used as a coating. In some embodiments, the doping material is combined with the zinc-based material to form the zinc-based alloy coating, which can be a ternary, quaternary, or "p"-ary (where "p" can be between 2 and "n"+2) material. The doping material(s) (also referred to as the temperature reducing agent) can be magnesium, tin, lithium, gallium, indium, copper, titanium, antimony, silicon, bismuth, lead, or potassium. The mass fraction of the dopant can be chosen to reduce the liquidus temperature. FIG. 19 illustrates a ternary diagram used to determine the liquidus temperature of quaternary Zn—Al—Mg-dopant systems. Example 3 provides a method to determine an appropriate mass fraction of the dopant(s). By way of non-limiting example, suitable zinc-based alloy coatings (i.e. zinc-based alloy material with the doping material) can include Zn-aAl-bMg-dopant, Zn-bMg-(x)dopant, Zn-aAl-(x)dopant, Zn-aAl-bMg-(x)dopant$_1$-(y)dopant$_2$, Zn-bMg-(x)dopant$_1$-(y)dopant$_2$, Zn-aAl-(x)dopant$_1$-(y)dopant$_2$, Zn-3.9Al-2.45Mg-(x)dopant, Zn-3.9Al-2.45Mg-(x)dopant$_1$-(y)dopant$_2$. Each of the coefficients (i.e. "a", "b", "x", or "y") can be selected so that liquidus temperature is less than the melting temperature of zinc. In some embodiments, the general formula for the zinc-based alloy coating comprising aluminum, "a" can be between 0 and 20. In some embodiments, "a" can be between 3.35 and 30. In some embodiments, "a" can be between 3.9 and 16.75. In some embodiments, "a" can be between 6.7 and 20. In some embodiments, "a" can be 0, 1, 2, 3, 3.35, 3.9, 4, 6, 6.7, 7, 8, 10, 10.05, 12, 13.4, 15, 16.75, or 20. For magnesium, in some embodiments, "b" can be between 0 and 20. In some embodiments, "b" can be between about 0 and 6.7. In some embodiments, "b" can be 0, 1, 2, 2.5, 3, 3.35, 4, or 6.7. For the dopant, in some embodiments, "x" can be between 0 and 40. In some embodiments, "x" can be between 1 and 20. In some embodiments, "x" can be between 1 and 10. Similarly, when a second or additional dopants are used, in some embodiments, each of the coefficients preceding the specific dopant can be between 0 and 40, between 1 and 20, or between 1 and 10.

The mass fraction of aluminum in the zinc-based alloy coatings can be less than about 20%. In some embodiments, the mass fraction of aluminum in the zinc-based alloy coating can be between about 3.35% and about 13.4%. In some embodiments, the mass fraction of aluminum in the zinc-based alloy coating can be greater than about 6.7% and less than about 20%. The mass fraction of magnesium in the zinc-based alloy coating can be less than about 10.05%. In some embodiments, the mass fraction of magnesium in the zinc-based alloy coating can be between about 0% and about 20%. The mass fraction of a dopant in the zinc-based alloy coating can be less than about 60%. In some embodiments, the mass fraction of the dopant in the zinc-based alloy coating can be between about 7.5% and about 12%. In some embodiments of the invention, the mass fraction of the dopant can be between about 1% and about 30%. When more than one dopant is used in the zinc-based alloy coating, the total mass fraction of the second to additional nth dopant in the reduced temperature coatings can be between about 0% and about 60%. In some embodiments, the total mass fraction of the additional dopant can be between about 1% and about 30%.

The resulting zinc-based alloy coating can have a liquidus temperatures that can be less than the melting temperature of zinc (i.e. about 419° C.). The liquidus temperature of the zinc-based alloy coating can be between about 275° C. and about 419° C. In some embodiments, the liquidus temperature of the zinc-based alloy coating can be between about 279° C. and about 365° C.

The zinc-based alloy coating can be applied at any thickness suitable for a particular application as set forth in ASTMs, such as for example ASTM A123/A123M. In some embodiments, the thickness of the coating can be applied to between about 5 microns and about 200 microns.

The coated substrate alloy advantageously is not carbon aged compared (for example via tension testing) to a substrate traditionally coated at high temperatures (i.e. above 420° C.). The coated substrate alloy can also have improved corrosion resistance compared to traditionally coated substrates. The corrosion resistance of a coated substrate of the present invention can provide sufficient protection for a substrate.

An aspect of the invention is a binary zinc alloy. The binary zinc alloy includes zinc and a second material. The mass fraction of the second material is most about 70%, and the mass fraction of the zinc is at least about 30%. The binary zinc alloy has a liquidus temperature that is below the melting temperature of zinc.

The second material can be aluminum, magnesium or tin. The liquidus temperature of the binary zinc alloy can be less than about 390° C. In some embodiments, the liquidus temperature of the binary zinc alloy can be between about 375° C. and about 390° C.

An aspect of the invention is a method to reduce a liquidus temperature of a zinc-based alloy coating for galvanizing. The method includes combining a zinc-based alloy with a dopant. The dopant is selected from the group consisting of aluminum, magnesium, copper, titanium, antimony, silicon, bismuth, gallium, indium, tin, lead, lithium, potassium or combinations thereof. The liquidus temperature of the zinc based alloy coating is less than the melting temperature of zinc.

The zinc-based alloy material can be pure zinc, a binary composition, a ternary composition, a quaternary composition, or a "n-ary" composition. In some embodiments, the zinc-based alloy material can include, but are not limited to, zinc-aluminum, zinc-aluminum-magnesium, zinc-magnesium, zinc-element(s), or other zinc based alloy material. Zinc based material useful for the invention have a liquidus temperature that is less than the melting temperature of zinc. The zinc-based alloy material can be used as a coating. In some embodiments, the doping material is combined with the zinc-based material to form the zinc-based alloy coating, which can be a ternary, quaternary, or "p"-ary (where "p" can be between 2 and "n"+2) material. The doping material(s) (also referred to as the temperature reducing agent) can be magnesium, tin, lithium, gallium, indium, copper, titanium, antimony, silicon, bismuth, lead, or potassium. The mass fraction of the dopant can be chosen to reduce the liquidus temperature. FIG. 19 illustrates a ternary diagram used to determine the liquidus temperature of quaternary Zn—Al—Mg-dopant systems. Example 3 provides a method to determine an appropriate mass fraction of the dopant(s). By way of non-limiting example, suitable zinc-based alloy coatings (i.e. zinc-based alloy material with the doping material) can include Zn-aAl-bMg-dopant, Zn-bMg-(x)dopant, Zn-aAl-(x)dopant, Zn-aAl-bMg-(x)dopant$_1$-(y)dopant$_2$, Zn-bMg-(x)dopant$_1$-(y)dopant$_2$, Zn-aAl-(x)dopant$_1$-(y)dopant$_2$, Zn-3.9Al-2.45Mg-(x)dopant, Zn-3.9Al-2.45Mg-(x)dopant$_1$-(y)dopant$_2$. Each of the coefficients (i.e. "a", "b", "x", or "y") can be selected so that liquidus temperature is less than the melting temperature of zinc. In some embodiments, the general formula for the zinc-based alloy coating comprising aluminum, "a" can be between 0 and 20. In some embodiments, "a" can be between 3.35 and 30. In some embodiments, "a" can be between 3.9 and 16.75. In some embodiments, "a" can be between 6.7 and 20. In some embodiments, "a" can be 0, 1, 2, 3, 3.35, 3.9, 4, 6, 6.7, 7, 8, 10, 10.05, 12, 13.4, 15, 16.75, or 20. For magnesium, in some embodiments, "b" can be between 0 and 20. In some embodiments, "b" can be between about 0 and 6.7. In some embodiments, "b" can be 0, 1, 2, 2.5, 3, 3.35, 4, or 6.7. For the dopant, in some embodiments, "x" can be between 0 and 40. In some embodiments, "x" can be between 1 and 20. In some embodiments, "x" can be between 1 and 10. Similarly, when a second or additional dopants are used, in some embodiments, each of the coefficients preceding the specific dopant can be between 0 and 40, between 1 and 20, or between 1 and 10.

The mass fraction of aluminum in the zinc-based alloy coatings can be less than about 20%. In some embodiments, the mass fraction of aluminum in the zinc-based alloy coating can be between about 3.35% and about 13.4%. In some embodiments, the mass fraction of aluminum in the zinc-based alloy coating can be greater than about 6.7% and less than about 20%. The mass fraction of magnesium in the zinc-based alloy coating can be less than about 10.05%. In some embodiments, the mass fraction of magnesium in the zinc-based alloy coating can be between about 0% and about 20%. The mass fraction of a dopant in the zinc-based alloy coating can be less than about 60%. In some embodiments, the mass fraction of the dopant in the zinc-based alloy coating can be between about 7.5% and about 12%. In some embodiments of the invention, the mass fraction of the dopant can be between about 1% and about 30%. When more than one dopant is used in the zinc-based alloy coating, the total mass fraction of the second to additional nth dopant in the reduced temperature coatings can be between about 0% and about 60%. In some embodiments, the total mass fraction of the additional dopant can be between about 1% and about 30%.

The melting temperature or liquidus temperature of the zinc-based alloy material without the dopant can be determined either by undue experimentation or by literature searching. For example, the melting temperature of pure zinc is about 419.5° C. The liquidus temperature of a Zn—Al—Mg alloy is about 344.5° C., which can be determined with a ternary phase diagram as explained in Example 3 below generated with experimentation or using software programs, or literature searching. A material discussed earlier is Zn-3.9Al-2.45Mg. The liquidus temperature of this material is 344.5° C. The melting temperature and liquidus temperature of a particular zinc-based alloy coating will depend upon the composition of the coating. The liquidus temperature of the zinc-based alloy coating can be less than about 420° C. In some embodiments, the liquidus temperature of the zinc alloy can be between about 279° C. and about 419° C. In some embodiments, the liquidus temperature of the zinc-based alloy coating can be between about 279° C. and about 365° C.

An advantage of the galvanizing coating of the present invention is that it can prevent or reduce carbon aging in the steel alloy substrate. Another advantage of the zinc-based alloy coating of the present invention is that the corrosion resistance properties of the new coating material can be as good, if not better than traditional zinc alloy materials without the dopant. Thus, embodiments of the invention are directed to a coated steel alloy substrate comprising the zinc-based alloy coating of the present invention wherein the corrosion resistance is better than the corrosion resistance of a traditional zinc coating (i.e. a traditional zinc coating, including zinc coatings without a dopant of the present invention). Another advantage is that martensite formation (such as is critical in quenching and partitioning) and austempering of the coated materials can occur at a lower temperature. The temperature can be between about 279° C. and about 419° C. Another advantage of the present invention is that martensite tempering is limited or controlled. Martensite is a hard phase that forms upon cooling. Tempering is a thermal process that softens the martensite to increase its toughness or formability. If martensite is formed prior to coating (by designing a cooling step into the process and then reheating before coating, or by using a lower coating bath temperature), quenching temperatures provide a lower tempering temperature.

Another aspect of the present invention is a low temperature coating process for the formation of an alternative microstructure in the steel substrate. Compared to prior art methods, transformation to martensite during immersion in the coating bath will be promoted at lower bath temperatures, and lower austempering temperatures (at which bainite forms) will be possible, enabling the formation of high strength formable microstructures and/or alternative microstructures.

The coating can have a liquidus temperatures that can be less than the melting temperature of zinc (i.e. about 419° C.). The liquidus temperature of the coating can be between about 275° C. and about 419° C. In some embodiments, the liquidus temperature of the coating can be between about 279° C. and about 365° C.

In some embodiments, the coating can be a zinc-based material and can include a doping material, which can be a ternary, quaternary, or "p"-ary material. In some embodiments, the zinc-based alloy material can include, but are not limited to, zinc-aluminum, zinc-aluminum-magnesium, zinc-magnesium, zinc-element(s), or other zinc based alloy material. Zinc based material useful for the invention have a liquidus temperature that is less than the melting temperature of zinc. The zinc-based alloy material can be used as a coating. The zinc-based material can be combined with a dopant to form the coating. The doping material(s) (also referred to as the temperature reducing agent) can be magnesium, tin, lithium, gallium, indium, copper, titanium, antimony, silicon, bismuth, lead, or potassium. The mass fraction of the dopant can be chosen to reduce the liquidus temperature. FIG. 19 illustrates a ternary diagram used to determine the liquidus temperature of quaternary Zn—Al—Mg-dopant systems. Example 3 provides a method to determine an appropriate mass fraction of the dopant(s). By way of non-limiting example, suitable zinc-based alloy coatings (i.e. zinc-based alloy material with the doping material) can include Zn-aAl-bMg-dopant, Zn-bMg-(x)dopant, Zn-aAl-(x)dopant, Zn-aAl-bMg-(x)dopant$_1$-(y)dopant$_2$, Zn-bMg-(x)dopant$_1$-(y)dopant$_2$, Zn-aAl-(x)dopant$_1$-(y)dopant$_2$, Zn-3.9Al-2.45Mg-(x)dopant, Zn-3.9Al-2.45Mg-(x)dopant$_1$-(y)dopant$_2$. Each of the coefficients (i.e. "a", "b", "x", or "y") can be selected so that liquidus temperature is less than the melting temperature of zinc. In some embodiments, the general formula for the zinc-based alloy coating comprising aluminum, "a" can be between 0 and 20. In some embodiments, "a" can be between 3.35 and 30. In some embodiments, "a" can be between 3.9 and 16.75. In some embodiments, "a" can be between 6.7 and 20. In some embodiments, "a" can be 0, 1, 2, 3, 3.35, 3.9, 4, 6, 6.7, 7, 8, 10, 10.05, 12, 13.4, 15, 16.75, or 20. For magnesium, in some embodiments, "b" can be between 0 and 20. In some embodiments, "b" can be between about 0 and 6.7. In some embodiments, "b" can be 0, 1, 2, 2.5, 3, 3.35, 4, or 6.7. For the dopant, in some embodiments, "x" can be between 0 and 40. In some embodiments, "x" can be between 1 and 20. In some embodiments, "x" can be between 1 and 10. Similarly, when a second or additional dopants are used, in some embodiments, each of the coefficients preceding the specific dopant can be between 0 and between 1 and 20, or between 1 and 10.

The mass fraction of aluminum in the coating can be less than about 20%. In some embodiments, the mass fraction of aluminum in the coating can be between about 3.35% and about 13.4%. In some embodiments, the mass fraction of aluminum in the coating can be greater than about 6.7% and less than about 20%. The mass fraction of magnesium in the coating can be less than about 10.05%. In some embodiments, the mass fraction of magnesium in the coating can be between about 0% and about 20%. The mass fraction of a dopant in the coating can be less than about 12%. In some embodiments, the mass fraction of the dopant in the coating can be between about 7.5% and about 12%. When more than one dopant is used in the coating, the total mass fraction of the second to additional nth dopant in the coating can be between about 0% and about 30%.

Another aspect of the present invention is a method of coating a steel substrate while forming an alternative microstructure than a microstructure that is possible using traditional processing. For example, a microstructure formed during traditional processing can result in either the formation of bainite, retention of the untransformed austenite at that step in the process or another microstructure in the steel such as ferrite, pearlite or martensite. The method includes providing a steel alloy material, and coating the steel alloy material with a zinc-based alloy coating. The operating temperature to apply the zinc-based alloy coating is at a quenching temperature for the steel alloy material to form at least one alternative microstructure. The alternative microstructure is different from a microstructure formed during traditional processing for the steel substrate.

Suitable steel alloy materials include, but are not limited to, steel sheets, strips, bars, rods, pipes, wires, reinforced bars, plates, hardware (for example fasteners). In particular, the present invention can be used with the broad class of sheet steel alloys.

Zinc-based alloy materials can be used as a coating. The zinc-based alloy material can be pure zinc, a binary composition, a ternary composition, a quaternary composition, or a "n-ary" composition. In some embodiments, the zinc-based alloy material can include, but are not limited to, zinc-aluminum, zinc-aluminum-magnesium, zinc-magnesium, zinc-element(s), or other zinc based alloy material. Zinc based material useful for the invention have a liquidus temperature that is less than the melting temperature of zinc.

In some embodiments, the doping material is combined with the zinc-based material to form the coating, which can be a ternary, quaternary, or "p"-ary (where "p" can be between 2 and "n"+2) material. The doping material (also referred to as the temperature reducing agent) can be magnesium, tin, lithium, gallium, indium, copper, titanium, antimony, silicon, bismuth, lead, or potassium. The mass fraction of the dopant can be chosen to reduce the liquidus temperature. FIG. 19 illustrates a ternary diagram used to determine the liquidus temperature of quaternary Zn—Al—Mg-dopant systems. Example 3 provides a method to determine an appropriate mass fraction of the dopant(s). By way of non-limiting example, suitable coatings that are zinc-based alloy coatings (i.e. zinc-based alloy material with the doping material) can include Zn-aAl-bMg-dopant, Zn-bMg-(x)dopant, Zn-aAl-(x)dopant, Zn-aAl-bMg-(x)dopant$_1$-(y)dopant$_2$, Zn-bMg-(x)dopant$_1$-(y)dopant$_2$, Zn-aAl-(x)dopant$_1$-(y)dopant$_2$, Zn-3.9Al-2.45Mg-(x)dopant, Zn-3.9Al-2.45Mg-(x)dopant$_1$-(y)dopant$_2$. Each of the coefficients (i.e. "a", "b", "x", or "y") can be selected so that liquidus temperature is less than the melting temperature of zinc. In some embodiments, the general formula for the zinc-based alloy coating comprising aluminum, "a" can be between 0 and 20. In some embodiments, "a" can be between 3.35 and 30. In some embodiments, "a" can be between 3.9 and 16.75. In some embodiments, "a" can be between 6.7 and 20. In some embodiments, "a" can be 0, 1, 2, 3, 3.35, 3.9, 4, 6, 6.7, 7, 8, 10, 10.05, 12, 13.4, 15, 16.75, or 20. For magnesium, in some embodiments, "b" can be between 0 and 20. In some embodiments, "b" can be between about 0 and 6.7. In some embodiments, "b" can be 0, 1, 2, 2.5, 3, 3.35, 4, or 6.7. For the dopant, in some embodiments, "x" can be between 0 and 40. Similarly, when a second or additional dopants are used, in some embodiments, each of the coefficients preceding the specific dopant can be between 0 and 40.

The mass fraction of aluminum in the coatings can be less than about 20%. In some embodiments, the mass fraction of aluminum in the coating can be between about 3.35% and about 13.4%. In some embodiments, the mass fraction of aluminum in the coating can be greater than about 6.7% and less than about 20%. The mass fraction of magnesium in the coating can be less than about 10.05%. In some embodiments, the mass fraction of magnesium in the coating can be between about 0% and about 20%. The mass fraction of a dopant in the coating can be less than about 12%. In some embodiments, the mass fraction of the dopant in the coating can be between about 7.5% and about 12%. When more than one dopant is used in the coating, the total mass fraction of the second to additional nth dopant in the coating can be between about 0% and about 30%.

The melting temperature or liquidus temperature of the zinc-based alloy material without the dopant can be determined either by undue experimentation or by literature searching. For example, the melting temperature of pure zinc is about 419.5° C. The liquidus temperature of a Zn—Al—Mg alloy is about 344.5° C., which can be determined with a ternary phase diagram as explained in Example 3 below generated with experimentation or using software programs, or literature searching. A material discussed earlier is Zn-3.9Al-2.45Mg. The liquidus temperature of this material is 344.5° C. The melting temperature and liquidus temperature of a particular coating will depend upon the composition of the coating. The liquidus temperature is at a temperature greater than room temperature (i.e. 25° C.), but less than 419° C. Thus, exposing the substrate to the liquidus temperature not only alloys for coating of the substrate, but also provides a heat treatment for the substrate material to form at least one alternative microstructure. The alternative microstructure is different from a microstructure formed during traditional processing for the steel substrate.

The alternative microstructure for example, can be selected from the group consisting of martensite, bainite, microstructures related to carbon aging for a particular steel substrate, and combinations thereof. In other situations, the alternative microstructural characteristics will be on a finer scale, related to differences in carbon aging or martensite tempering. In some embodiments, the coated substrate can be exposed to a second quenching temperature to form a second microstructure in the steel alloy. For example, a microstructure formed during traditional processing can result in either the formation of bainite, retention of the untransformed austenite at that step in the process or another microstructure in the steel such as ferrite, pearlite or martensite.

The coating can be applied to the metallic material by dipping or spraying. The coating can be heated to an operating temperature, which is above the melting temperature or the liquidus temperature to liquify the coating prior to application. The coating can be applied at any thickness suitable for a particular application as set forth in ASTMs, such as for example ASTM A123/A123M. In some embodiments, the thickness of the coating can be applied to between about 5 microns and about 200 microns.

The surface of the metallic material can be treated to increase adhesion of the coating to the substrate. The surface treatment can include, for example, cleaning, etching, mechanical abrasion, or chemical etching. The surface treatment can increase the surface area of the substrate.

Another aspect of the present invention is a coated steel alloy with an alternative microstructure. The coated steel alloy includes a zinc-based alloy coating and a steel alloy substrate. The steel substrate is exposed to the coating (as a liquid) at the quenching temperature for the steel, to form an alternative microstructure in the coated steel.

Suitable steel alloy materials include, but are not limited to, steel sheets, strips, bars, rods, pipes, wires, reinforced bars, plates, hardware (for example fasteners). In particular, the present invention can be used with the broad class of sheet steel alloys.

Zinc-based alloy materials can be used as a coating. The zinc-based alloy material can be pure zinc, a binary composition, a ternary composition, a quaternary composition, or a "n-ary" composition. In some embodiments, the zinc-based alloy material can include, but are not limited to, zinc-aluminum, zinc-aluminum-magnesium, zinc-magnesium, zinc-element(s), or other zinc based alloy material. Zinc based material useful for the invention have a liquidus temperature that is less than the melting temperature of zinc. In some embodiments, the doping material is combined with the zinc-based material to form the zinc-based alloy coating, which can be a ternary, quaternary, or "p"-ary (where "p" can be between 2 and "n"+2) material. The doping material (also referred to as the temperature reducing agent) can be magnesium, tin, lithium, gallium, indium, copper, titanium, antimony, silicon, bismuth, lead, or potassium. The mass fraction of the dopant can be chosen to reduce the liquidus temperature. FIG. 19 illustrates a ternary diagram used to determine the liquidus temperature of quaternary Zn—Al—Mg-dopant systems. Example 3 provides a method to determine an appropriate mass fraction of the dopant(s). By way of non-limiting example, suitable zinc-based alloy coatings (i.e. zinc-based alloy material with the doping material) can include Zn-aAl-bMg-dopant, Zn-bMg-(x)dopant, Zn-aAl-(x)dopant, Zn-aAl-bMg-(x)dopant$_1$-(y)dopant$_2$, Zn-bMg-(x)dopant$_1$-(y)dopant$_2$, Zn-aAl-(x)dopant$_1$-(y)dopant$_2$, Zn-3.9Al-2.45Mg-(x)dopant, Zn-3.9Al-2.45Mg-(x)dopant$_1$-(y)dopant$_2$. Each of the coefficients (i.e. "a", "b", "x", or "y") can be selected so that liquidus temperature is less than the melting temperature of zinc. In some embodiments, the general formula for the zinc-based alloy coating comprising aluminum, "a" can be between 0 and 20. In some embodiments, "a" can be between 3.35 and 30. In some embodiments, "a" can be between 3.9 and 16.75. In some embodiments, "a" can be between 6.7 and 20. In some embodiments, "a" can be 0, 1, 2, 3, 3.35, 3.9, 4, 6, 6.7, 7, 8, 10, 10.05, 12, 13.4, 15, 16.75, or 20. For magnesium, in some embodiments, "b" can be between 0 and 20. In some embodiments, "b" can be between about 0 and 6.7. In some embodiments, "b" can be 0, 1, 2, 2.5, 3, 3.35, 4, or 6.7. For the dopant, in some embodiments, "x" can be between 0 and 40. Similarly, when a second or additional dopants are used, in some embodiments, each of the coefficients preceding the specific dopant can be between 0 and 40.

The mass fraction of aluminum in the zinc-based alloy coatings can be less than about 20%. In some embodiments, the mass fraction of aluminum in the zinc-based alloy coating can be between about 3.35% and about 13.4%. In some embodiments, the mass fraction of aluminum in the zinc-based alloy coating can be greater than about 6.7% and less than about 20%. The mass fraction of magnesium in the zinc-based alloy coating can be less than about 10.05%. In some embodiments, the mass fraction of magnesium in the zinc-based alloy coating can be between about 0% and about 20%. The mass fraction of a dopant in the zinc-based alloy coating can be less than about 60%. In some embodiments, the mass fraction of the dopant in the zinc-based alloy coating can be between about 7.5% and about 12%. In some embodiments of the invention, the mass fraction of the dopant can be between about 1% and about 30%. When more than one dopant is used in the zinc-based alloy coating, the total mass fraction of the second to additional nth dopant in the reduced temperature coatings can be between about 0% and about 60%. In some embodiments, the total mass fraction of the additional dopant can be between about 1% and about 30%.

The resulting zinc-based alloy coating can have a liquidus temperatures that can be less than the melting temperature of zinc (i.e. about 419° C.). The liquidus temperature of the zinc-based alloy coating can be between about 275° C. and about 419° C. In some embodiments, the liquidus temperature of the zinc-based alloy coating can be between about 279° C. and about 365° C. The melting temperature or liquidus temperature of the zinc-based alloy material without the dopant can be determined either by undue experimentation or by literature searching. For example, the melting temperature of pure zinc is about 419.5° C. The liquidus temperature of a Zn—Al—Mg alloy is about 344.5° C., which can be determined with a ternary phase diagram as explained in Example 3 below generated with experimentation or using software programs, or literature searching. A material discussed earlier is Zn-3.9Al-2.45Mg. The liquidus temperature of this material is 344.5° C. The melting temperature and liquidus temperature of a particular zinc-based alloy coating will depend upon the composition of the coating.

The zinc-based alloy coating can be applied to the metallic material by dipping or spraying. The zinc-based alloy coating can be heated to an operating temperature, which is above the melting temperature or the liquidus temperature to liquify the zinc-based alloy coating prior to application. The zinc-based alloy coating can be applied at any thickness suitable for a particular application as set forth in ASTMs, such as for example ASTM A123/A123M. In some embodiments, the thickness of the coating can be applied to between about 5 microns and about 200 microns.

The alternative microstructure for example, can be selected from the group consisting of martensite, bainite, microstructures related to carbon aging for a particular steel substrate, and combinations thereof. In other situations, the alternative microstructural characteristics will be on a finer scale, related to differences in carbon aging or martensite tempering. In some embodiments, the coated substrate can be exposed to a second quenching temperature to form a second microstructure in the steel alloy. For example, a microstructure formed during traditional processing can result in either the formation of bainite, retention of the untransformed austenite at that step in the process or another microstructure in the steel such as ferrite, pearlite or martensite.

EXAMPLES

Example 1

Figure 2:
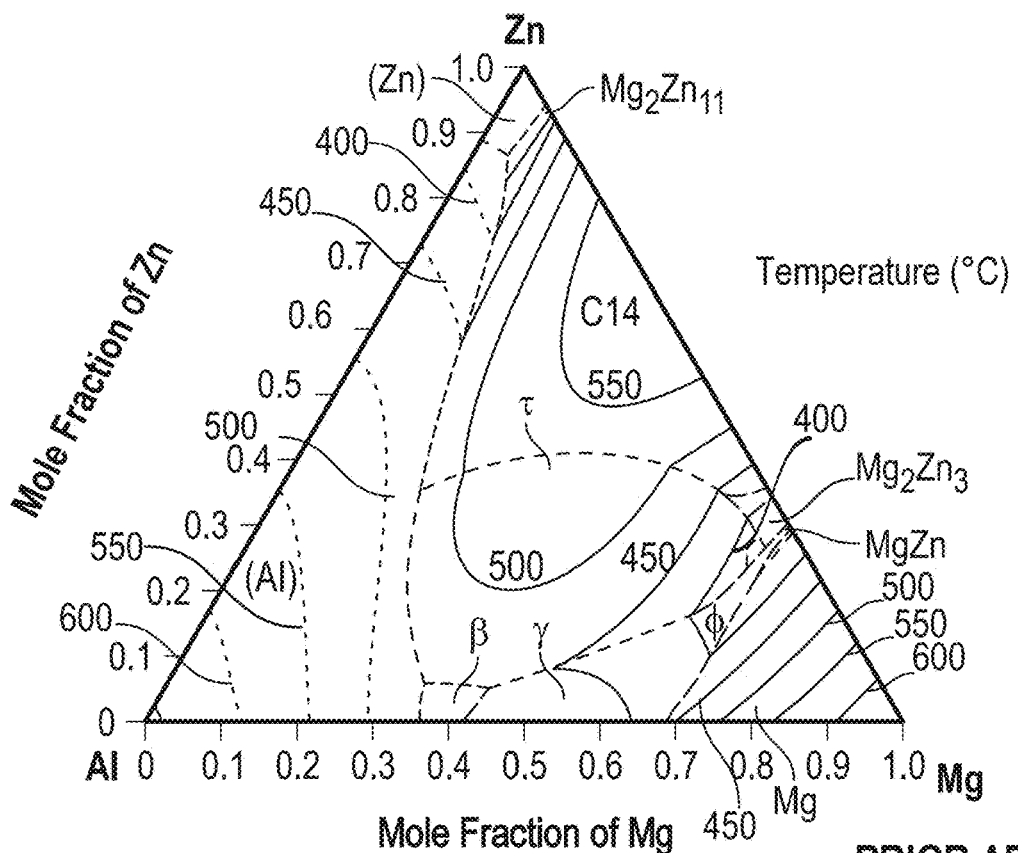
FIG. 2 provides a ternary graph of a Zn—Al—Mg system from literature for comparison to FIG. 1.
Figure 3A:
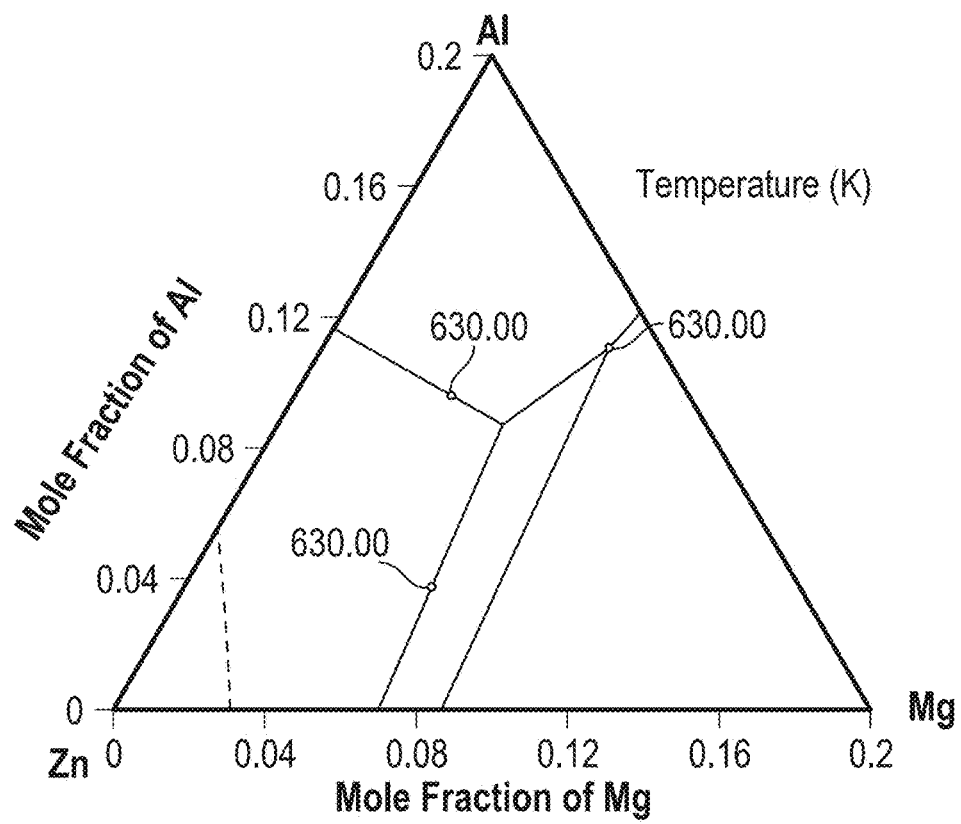
FIG. 3A illustrates liquidus projections of a Zn—Al—Mg system in mole fraction.
Figure 3B:
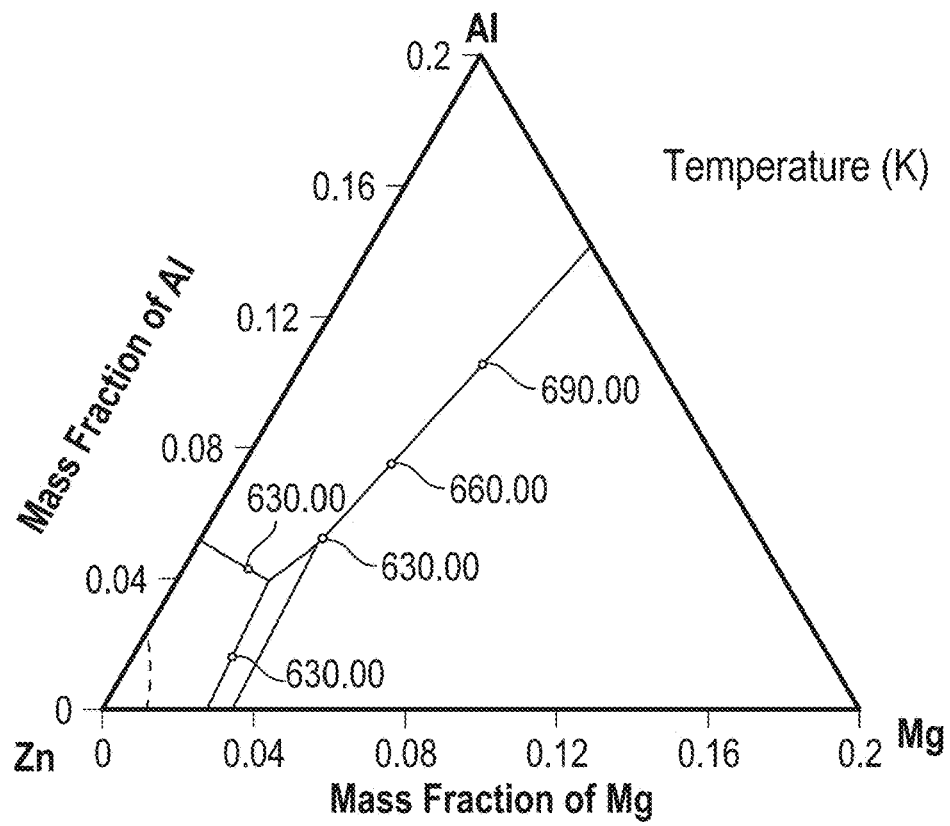
FIG. 3B illustrates the liquidus projection of a Zn—Al—Mg system in mass fraction.
Figure 4A:
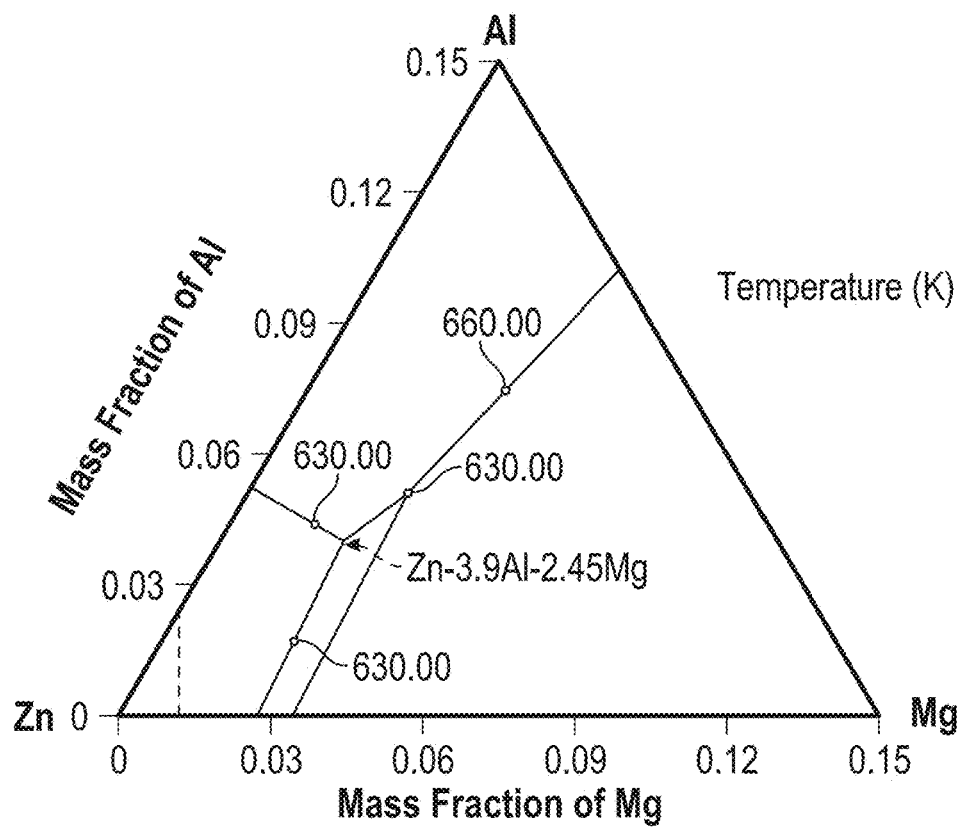
FIG. 4A illustrates the liquidus surface of the Zn—Al—Mg system.
Figure 4B:
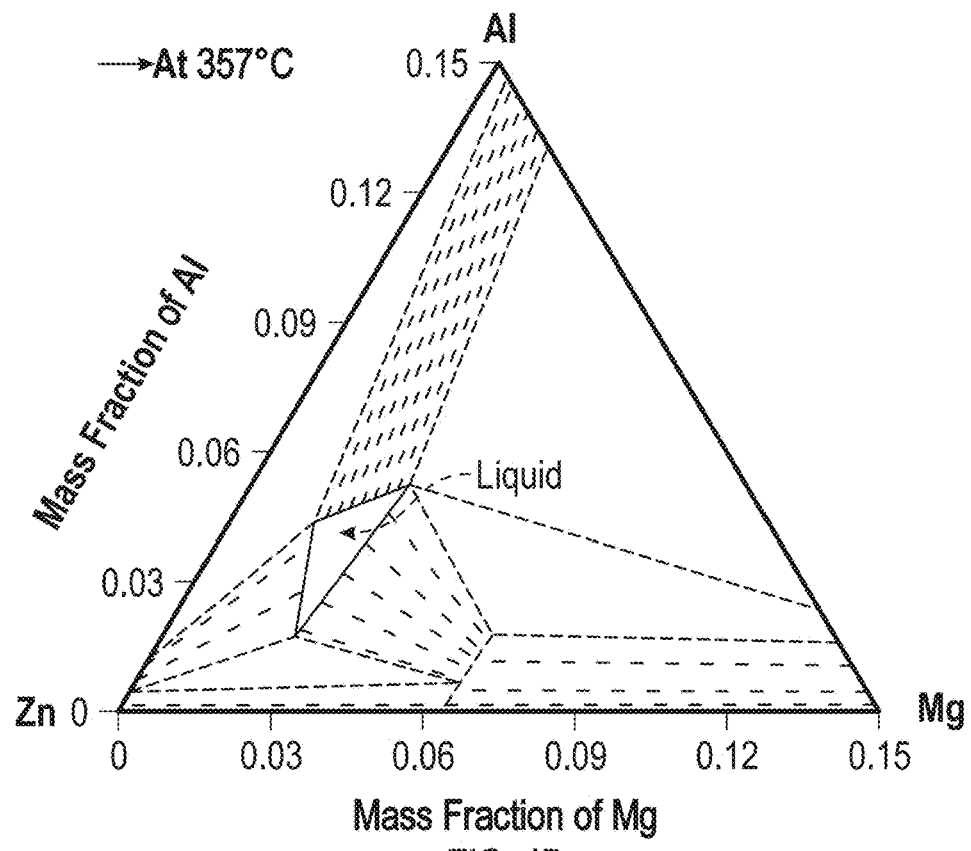
FIG. 4B illustrates the liquid point for a Zn—Al—Mg system at about 630K.
Figure 4C:
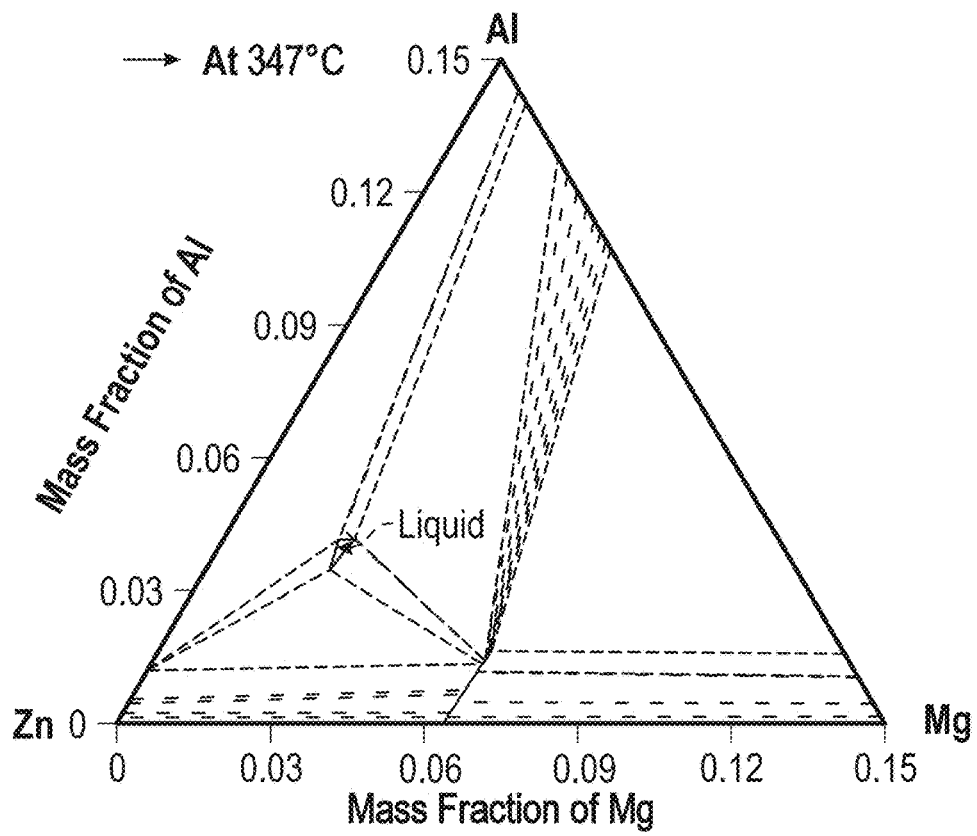
FIG. 4C indicates the liquid point for a Zn—Al—Mg system at about 620K.
Figure 4D:
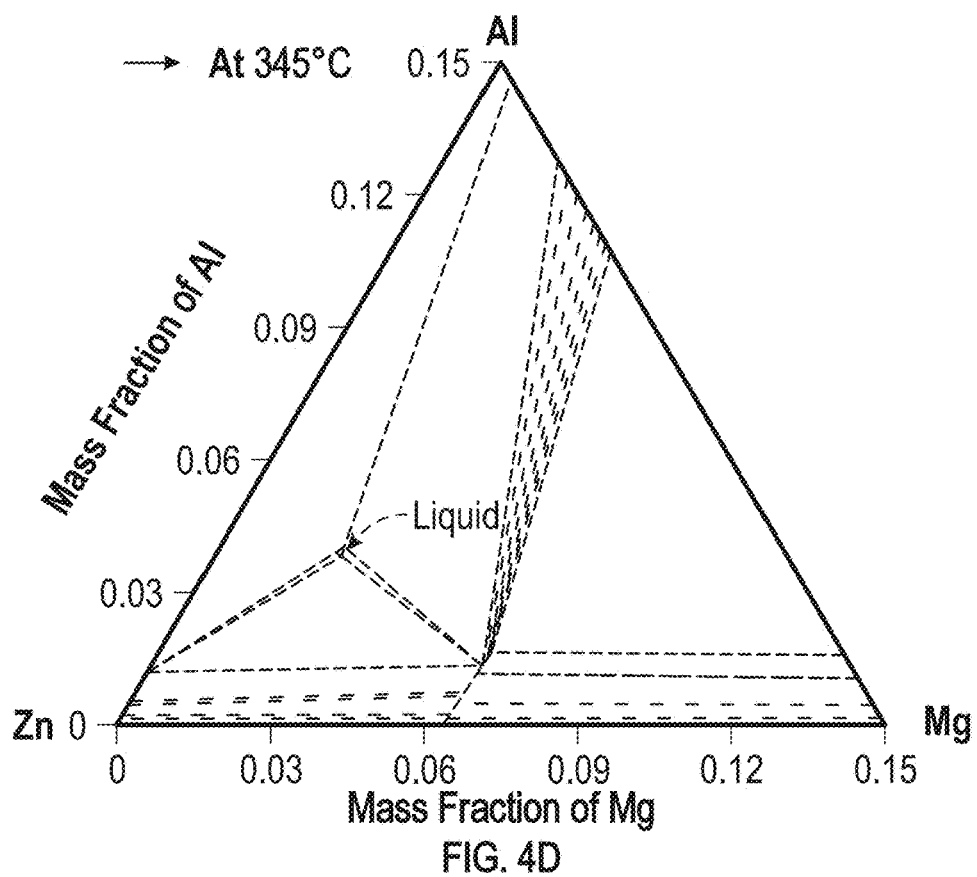
FIG. 4D indicates the liquid point for a Zn—Al—Mg system at about 618K.

FIG. 1 illustrates a ternary graph of zinc-aluminum-magnesium system at different mole fractions made using Thermo-Calc Software. The temperature in the graph are in Kelvin. The eutectic temperature is below 630K. FIG. 2 provides a ternary graph of Zn—Al—Mg system from literature (P. Liang, et al. Thermochimica Acta, 314 (1998) 87-110) for comparison to FIG. 1. The temperatures in FIG. 2 are in Celsius. FIG. 3A illustrates liquidus projections of a Zn—Al—Mg system in mole fraction, while FIG. 3B illustrates the liquidus projection of a Zn—Al—Mg system in mass fraction. FIGS. 4A-4D illustrate isotherm sections at different temperatures (mass fraction). FIG. 4A illustrates liquidus surface of the Zn—Al—Mg system. The eutectic point of the Zn—Al—Mg system is about 344.5° C. (about 617.5K) for Zn-3.9Al-2.45Mg. The liquid point for Zn—Al—Mg at about 357° C. (about 630K) is indicated on the graph of FIG. 4B. FIG. 4C indicates the liquid point for Zn—Al—Mg at about 347° C. (about 620K). FIG. 4D indicates the liquid point for Zn—Al—Mg at about 345° C. (about 618K). As illustrated in FIGS. 4B-4D, the area for the liquid states decreases as the temperature decreases for this material.

The Scheil equation can be used to determine the liquidus temperature of Zn—Al—Mg systems. The liquidus temperature of Zn-3.9Al-2.45Mg calculated with this equation is about 344.5° C. The liquidus temperature for Zn-4Al-3Mg-8Sn was calculated as about 330° C. using the Scheil equation.

Example 2

The liquidus temperatures for potential quaternary systems can be estimated using ternary results as a starting point. Several dopants were considered for combination with Zn—Al—Mg. The dopants include copper, titanium, antimony, tin, bismuth, gallium, and indium. The liquidus temperature for Zn—Al—Mg—Ti may be higher than about 350° C., and therefore do not provide the benefit of reducing the liquidus temperature of the coating.

Figure 5:
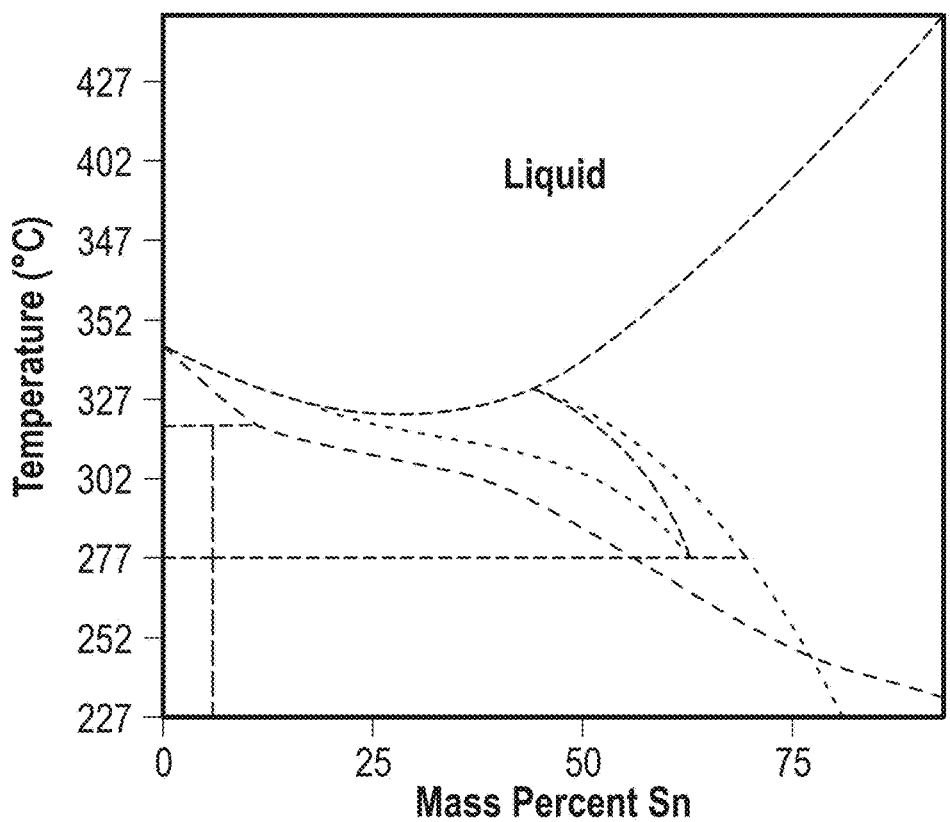
FIG. 5 illustrates a phase diagram for Zn-3.9Al-2.45Mg-xSn, where the mass fraction of Al and Mg were held constant.
Figure 6:
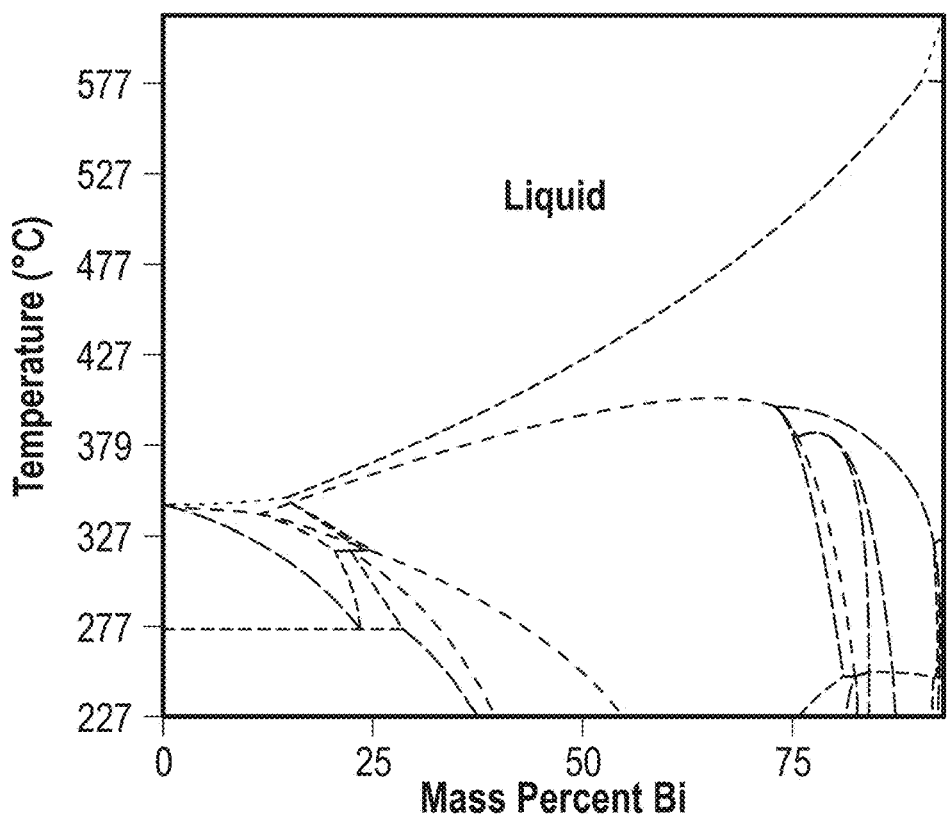
FIG. 6 illustrates a phase diagram for Zn-3.9Al-2.45Mg-xBi, where the mass fraction of Al and Mg were held constant.
Figure 7:
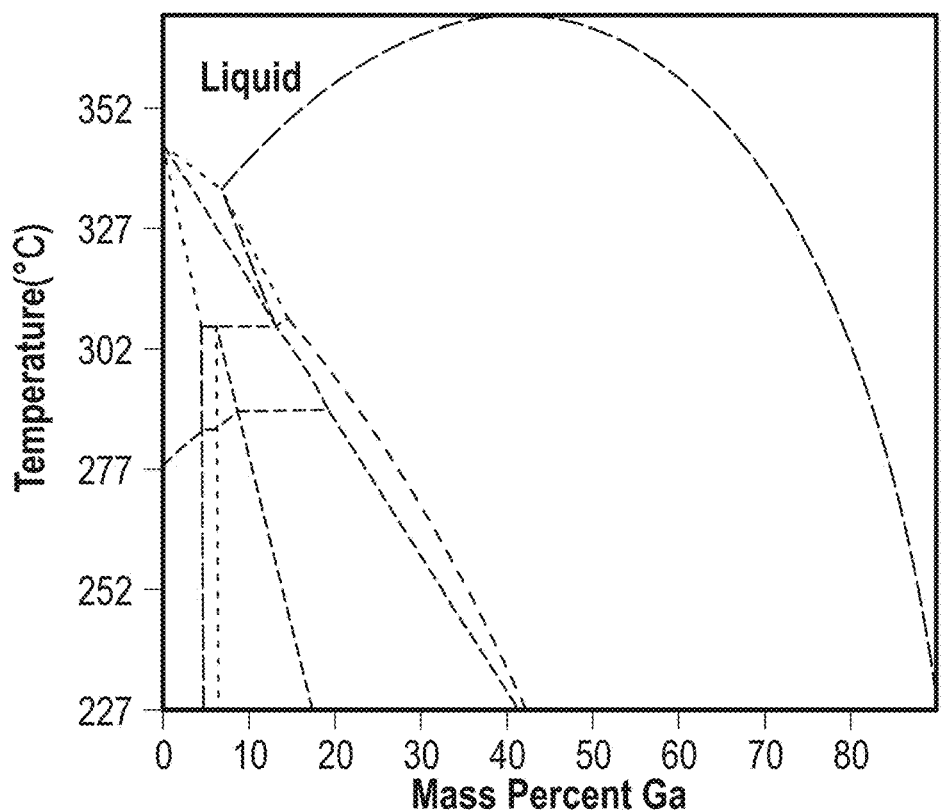
FIG. 7 illustrates a phase diagram for Zn-3.9Al-2.45Mg-xGa, where the mass fraction of Al and Mg were held constant.
Figure 8:
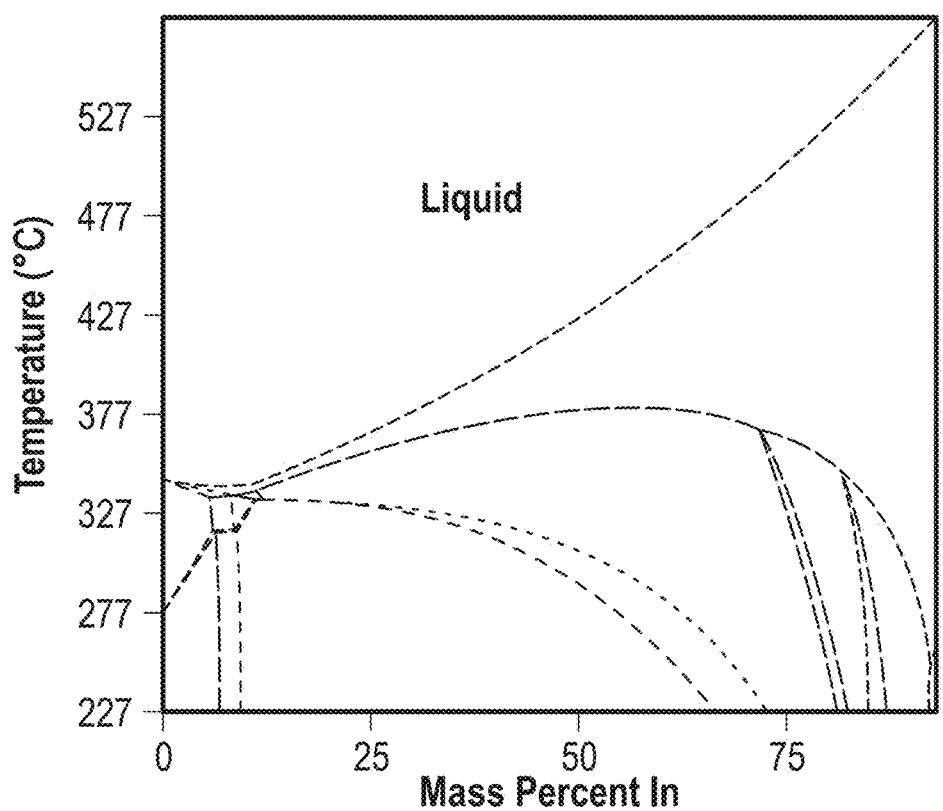
FIG. 8 illustrates a phase diagram for Zn-3.9Al-2.45Mg-xIn, where the mass fraction of Al and Mg were held constant.

FIGS. 5-8 each illustrate the liquid phase for a variety of mass percentages for the particular element (i.e. Sn, Bi, Ga, Cu or In) and the melting temperature for particular compositions. FIG. 5 illustrates a phase diagram for Zn-3.9Al-2.45Mg-xSn, where the fraction of Al and Mg were held constant. FIG. 6 illustrates a phase diagram for Zn-3.9Al-2.45Mg-xBi, where the fraction of Al and Mg were held constant. FIG. 7 illustrates a phase diagram for Zn-3.9Al-2.45Mg-xGa, where the fraction of Al and Mg were held constant. FIG. 8 illustrates a phase diagram for Zn-3.9Al-2.45Mg-xIn, where the fraction of Al and Mg were held constant.

Figure 9:
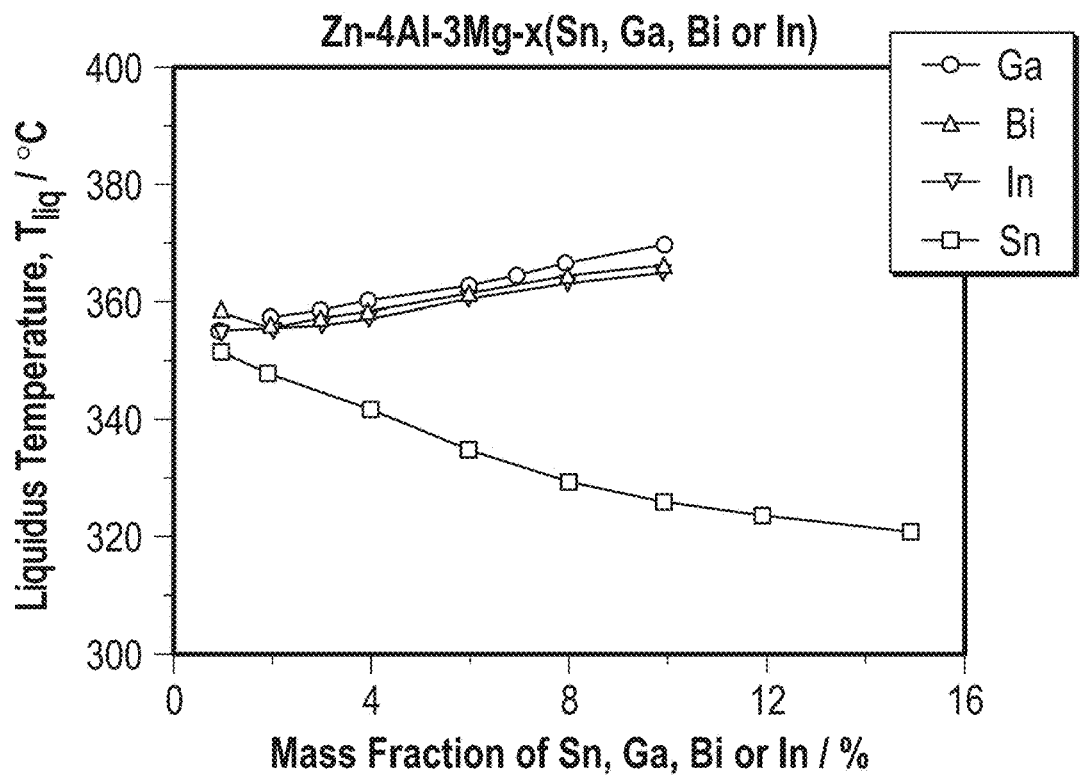
FIG. 9 illustrates liquidus temperature for various mass fractions in percent for four doping materials.
Figure 10:
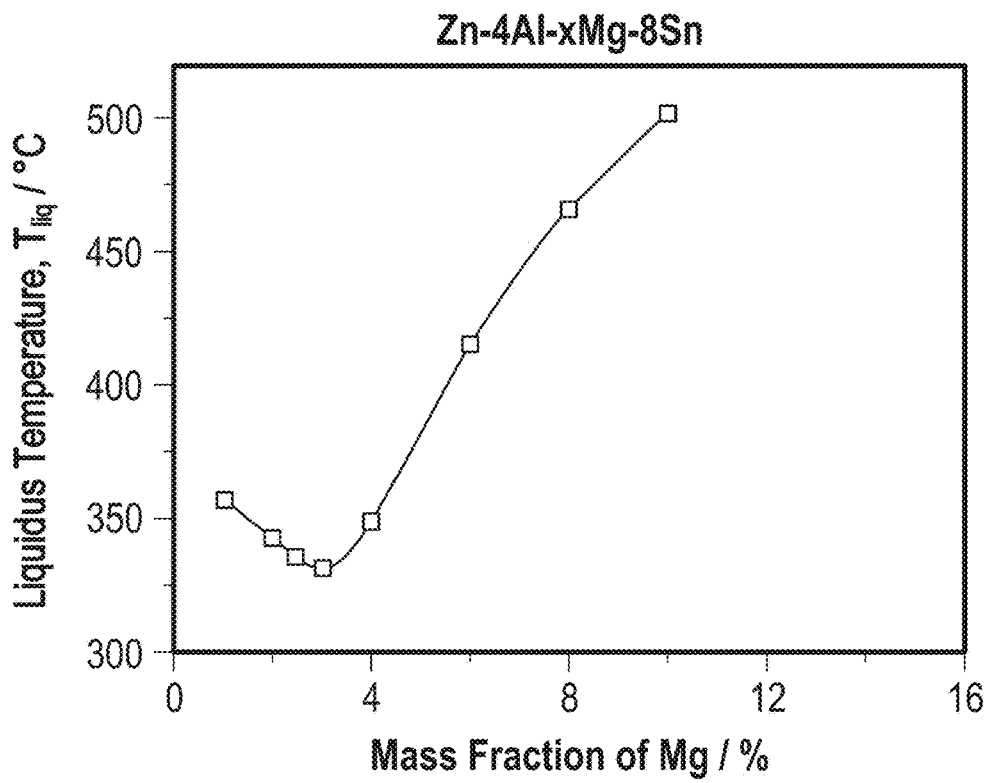
FIG. 10 illustrates liquidus temperature for various mass fractions of magnesium in a Zn-4Al-xMg-8Sn.
Figure 11:
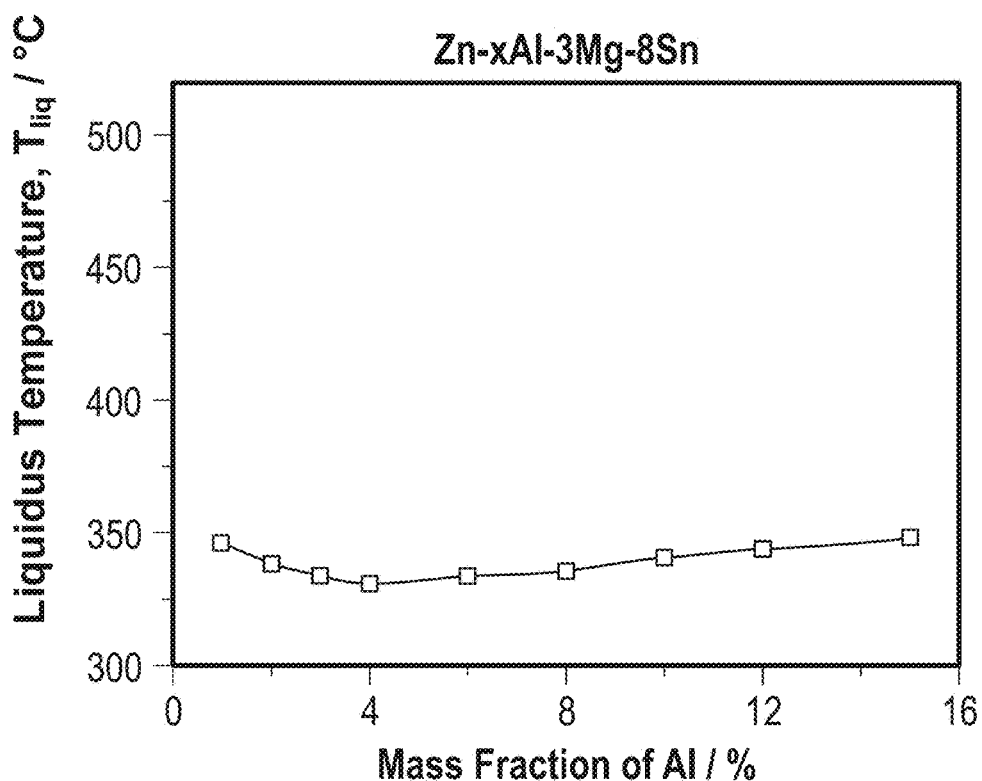
FIG. 11 illustrates liquidus temperature for various mass fractions of aluminum in a Zn-xAl-3Mg-8Sn system.
Figure 12:
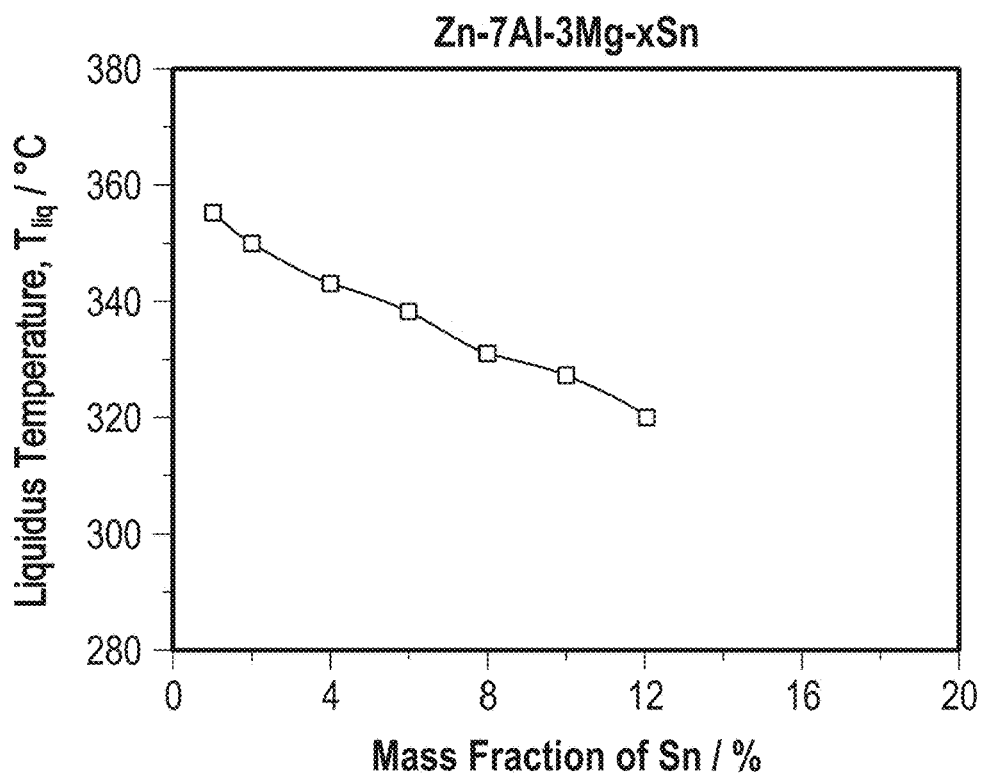
FIG. 12 illustrates the liquidus temperature for various mass fractions of tin in a Zn-7Al-3Mg-xSn.
Figure 13:
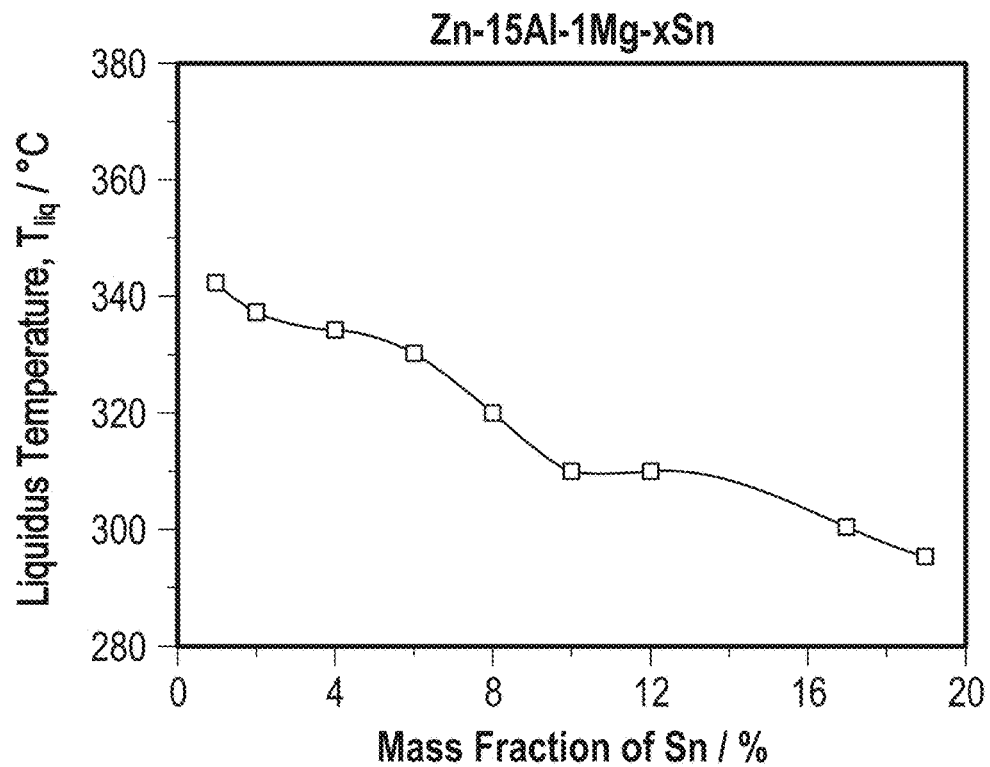
FIG. 13 illustrates the liquidus temperature for various mass fractions of tin in a Zn-15Al-1Mg-xSn system.
Figure 14:
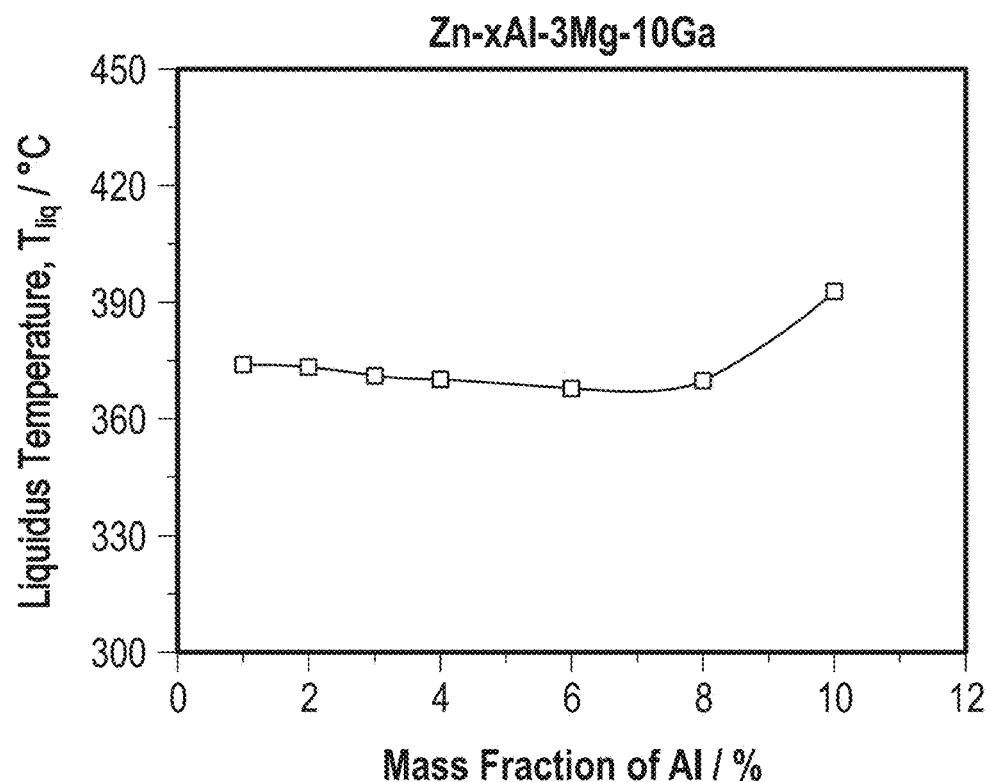
FIG. 14 illustrates the liquidus temperature when the mass fraction of aluminum is between about 0.5% and about 10% for a Zn-xAl-3Mg-10Ga system.
Figure 15:
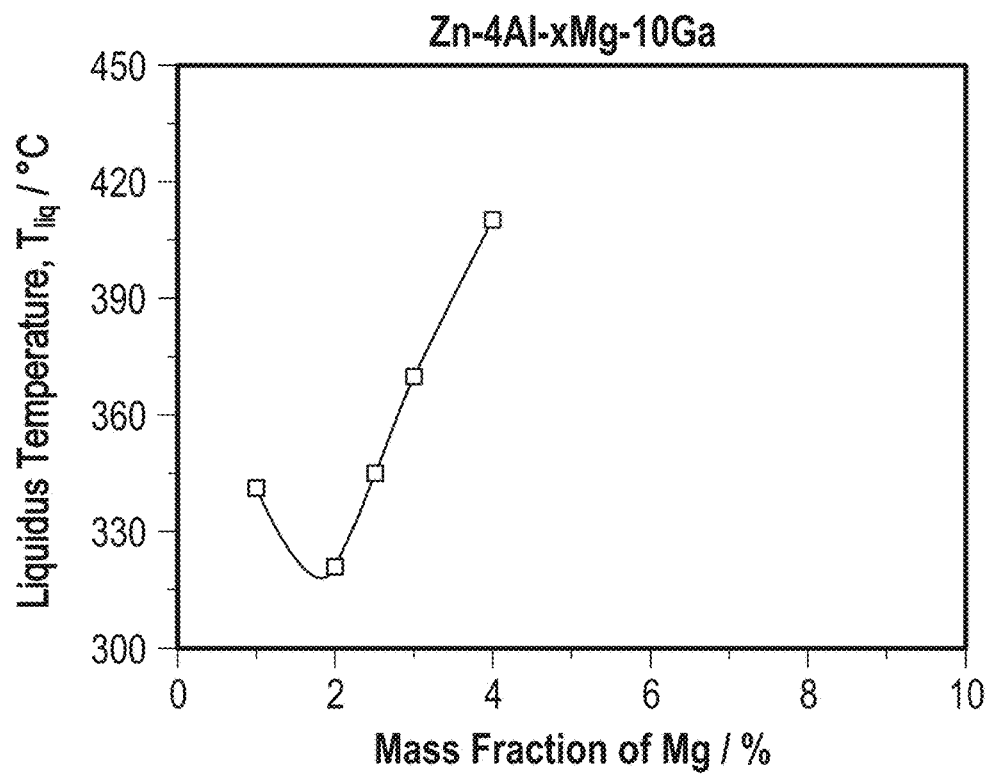
FIG. 15 illustrates the liquidus temperature when the mass fraction is between about 1% and about 4% in a Zn-4Al-xMg-10Ga.
Figure 16:
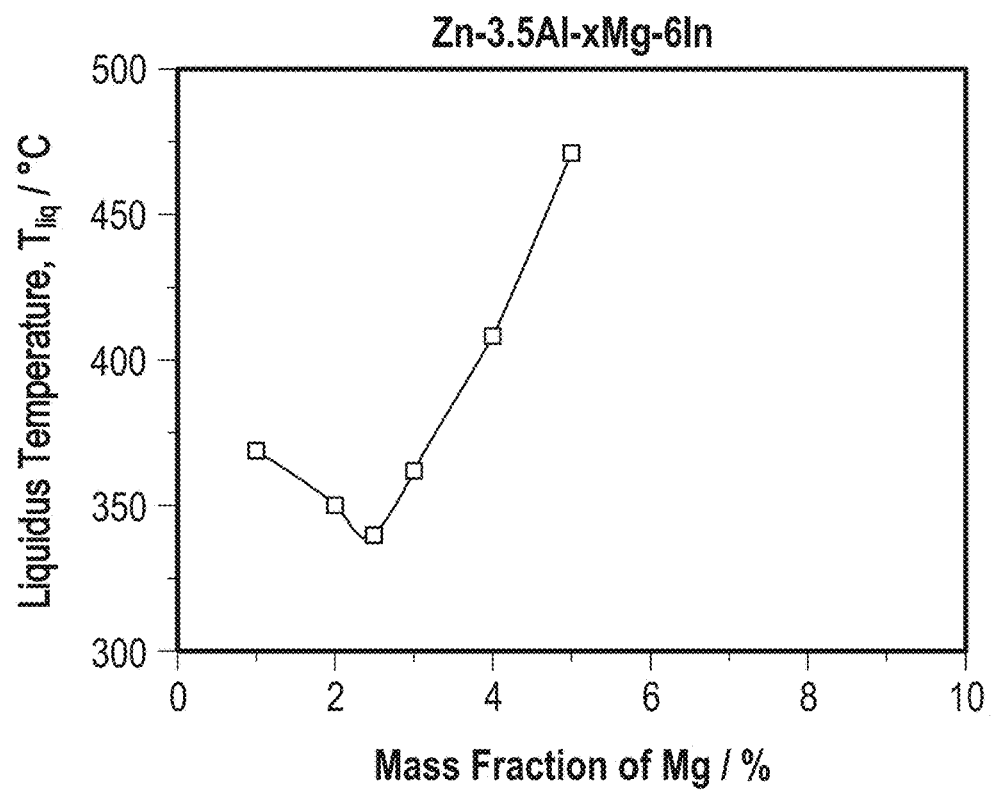
FIG. 16 illustrates the liquidus temperature for mass fractions of magnesium between about 1% and about 5% in a Zn-3.5Al-xMg-6In.
Figure 17:
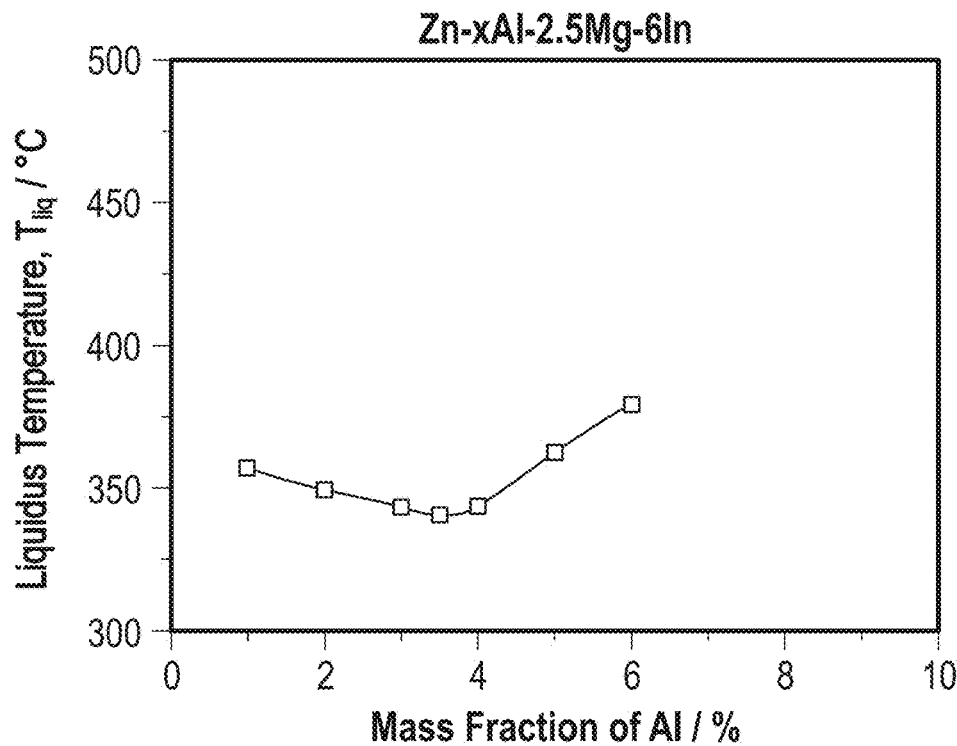
FIG. 17 illustrates the liquidus temperature for mass fractions of aluminum between about 1% and about 6% in a Zn-xAl-2.5Mg-6In.

FIG. 9 illustrates liquidus temperatures for various mass fractions in percent for four doping materials. Tin illustrated the lowest liquidus temperature for various mass fractions. FIGS. 10-17 illustrate other Zn—Al—Mg-dopant systems that can be used with the present invention. FIG. 10 illustrates liquidus temperatures for various mass fractions of magnesium in a Zn-4Al-xMg-8Sn. The liquidus temperature approaches about 500° C. when the mass fraction of magnesium was approximately 10. FIG. 11 illustrates liquidus temperatures for various mass fractions of aluminum in a Zn-xAl-3Mg-8Sn system. The liquidus temperature of the Zn-xAl-3Mg-8Sn system is less than about 350° C. when the mass fraction of aluminum is between about 0.5% and about 15.5%. FIG. 12 illustrates the liquidus temperature for various mass fractions of tin in a Zn-7Al-3Mg-xSn. The liquidus temperature was less than about 360° C. when the mass fraction of tin was between about 0.5% and about 12%. FIG. 13 illustrates the liquidus temperature for various mass fractions of Sn in a Zn-15Al-1Mg-xSn system. The liquidus temperature is less than about 350° C. when the mass fraction is between about 0.5% and about 19%. FIG. 14 illustrates the liquidus temperature that is less than about 415° C. when the mass fraction of aluminum is between about 0.5% and about 10% for a Zn-xAl-3Mg-10Ga system. FIG. 15 illustrates the liquidus temperature is less than about 420° C. when the mass fraction is between about 1% and about 4% in a Zn-4Al-xMg-10Ga. FIG. 16 illustrates the liquidus temperature is less than about 475° C. for mass fractions of magnesium between about 1% and about 5% in a Zn-3.5Al-xMg-6In. FIG. 17 illustrates the liquidus temperature is less than about 375° C. for mass fractions of aluminum between about 1% and about 6% in a Zn-xAl-2.5Mg-6In.

Table 1 provides various liquidus temperatures for different compositions (wt. %) Zn—Al—Mg-dopant systems can have liquidus temperatures as low as about 300° C., which can be used for galvanization. The temperatures in Table 1 are approximate.

TABLE 1

| System | Liquidus Temperature (° C.) |
|---|---|
| Zn-3.5Al-2.5Mg-6In | 340 |
| Zn-4Al-2Mg-10Ga | 321 |
| Zn-4Al-3Mg-8Sn | 330 |
| Zn-4Al-3Mg-4Bi | 356 |
| Zn-4Al-3Mg-4Ga | 365 |
| Zn-4Al-3Mg-1In | 350 |
| Zn-7Al-3Mg-12Sn | 320 |
| Zn-15Al-1Mg-4Sn | 320 |
| Zn-15Al-1Mg-17Sn | 300 |

Figure 18:
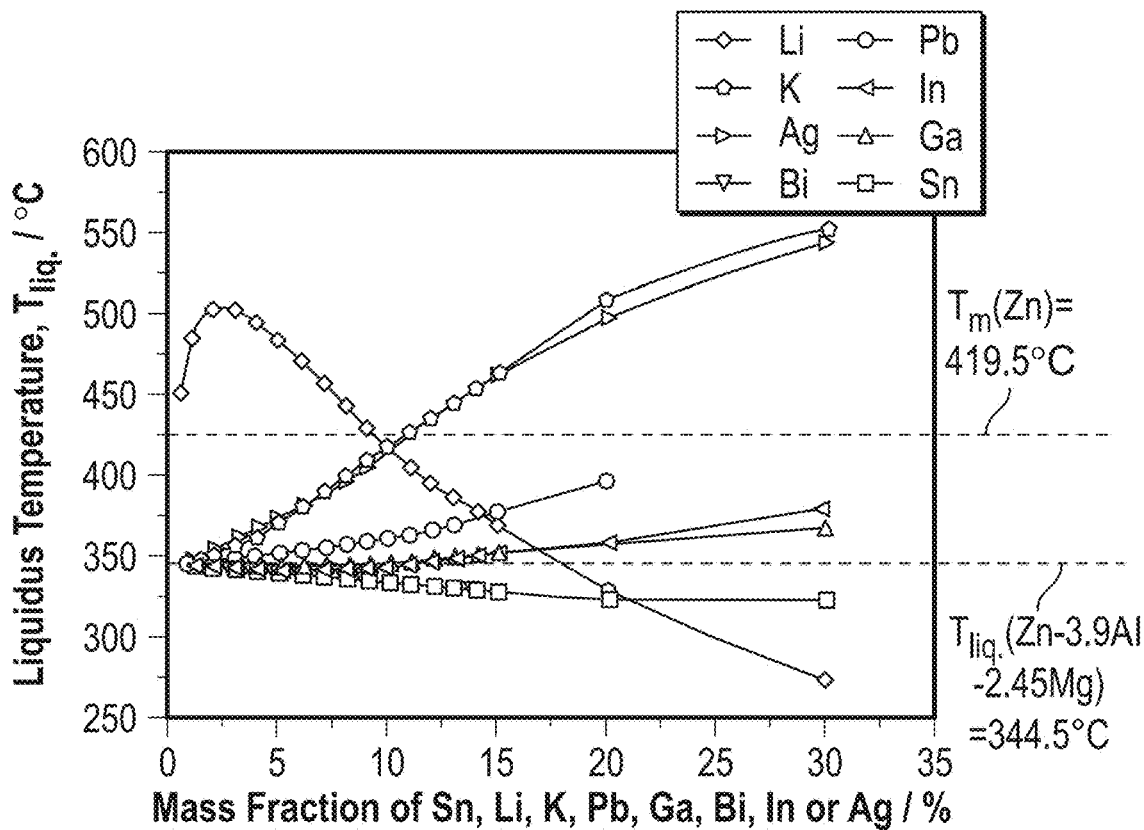
FIG. 18 illustrates liquidus temperatures for various mass fractions for several dopants in a Zn-3.9Al-2.45Mg-dopant system.

FIG. 18 illustrates liquidus temperatures for various mass fractions for several dopants in a Zn-3.9Al-2.45Mg-dopant system. Also included in FIG. 18 is the melting temperature for pure zinc and the liquidus temperature for Zn-3.9Al-2.45Mg. For Zn-3.9Al-2.45Mg-dopant systems, adding lead, silver, antimony, potassium and bismuth increased the liquid temperatures of the Zn-3.9Al-2.45Mg-dopant systems. Adding gallium, indium, tin or lithium lowered the liquidus temperatures at specific compositions in the Zn-3.9Al-2.45Mg-dopant systems. Adding tin or lithium was more effective at lowering the liquidus temperature of a Zn-3.9Al-2.45Mg-dopant system compared to gallium or indium.

Example 3

The following method was utilized to determine the liquidus temperature for various Zn—Al—Mg-dopant systems. FIG. 19 illustrates a ternary diagram used to determine the liquidus temperature of quaternary Zn—Al—Mg-dopant systems. First, a Zn—Al—Mg ternary diagram was divided by smaller equilateral triangles, then points were selected to calculate the liquidus temperature of quaternary alloys with a dopant added (e.g. tin as the dopant). Next, the temperature at which the calculated volume fraction of liquid when each quaternary alloy was 100% was determined as the liquidus temperature of the quaternary alloy. The calculation starts from the points near the eutectic temperature of a Zn—Al—Mg system. When the temperature of the quaternary alloy is less than about 344.5° C., additional points near this temperature are calculated. Software, for example ThermoCalc, can be used for these calculations.

For high order alloy systems (e.g. quaternary system), a good starting point for the calculation can be effective to find the phase equilibrium in the multi-component systems. For instance, a good starting point for the calculation of the quaternary Zn—Al—Mg—Sn is an equilibrium close to an invariant point belonging to a lower order system (i.e. the ternary eutectic of Zn—Al—Sn). It is not guaranteed that the lowest liquidus temperature of the quaternary alloy must occur around the eutectic point of a lower order system.

Example 4

Experiments were conducted and calculated for various Zn—Al—Mg—Sn systems to illustrate the invention of the present invention. One skilled in the art would understand that other dopants could be used besides tin and liquidus temperatures can be calculated without undue experimentation.

Figure 20:
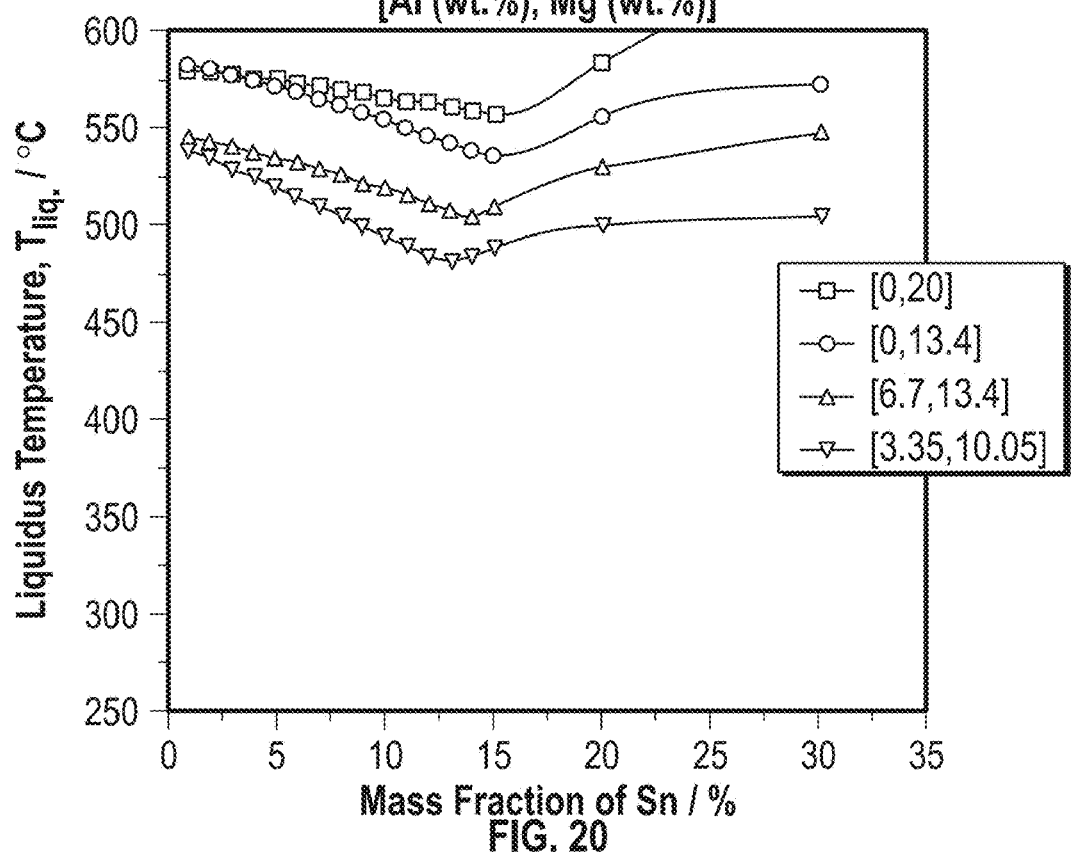
FIG. 20 illustrates liquidus temperatures for various mass fraction of tin.
Figure 21:
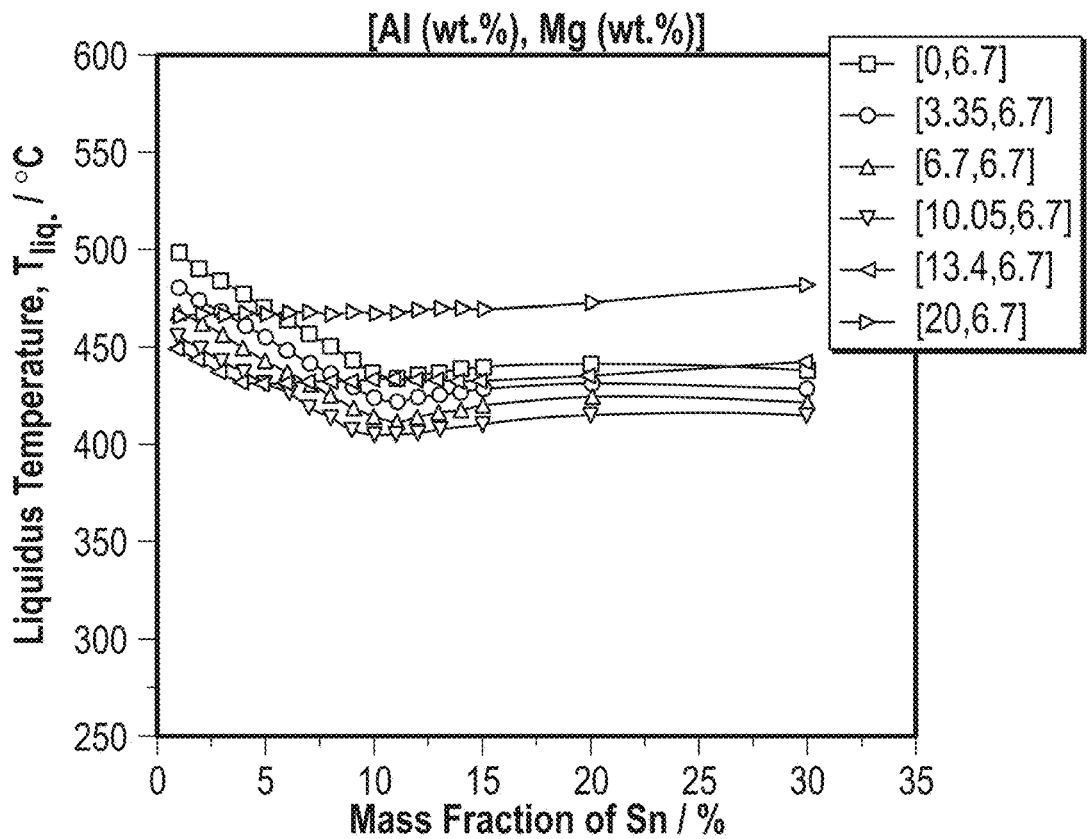
FIG. 21 illustrates illustrate liquidus temperatures for various mass fractions of tin for various weight percent of aluminum and magnesium for a Zn—Al—Mg—Sn system.
Figure 22:
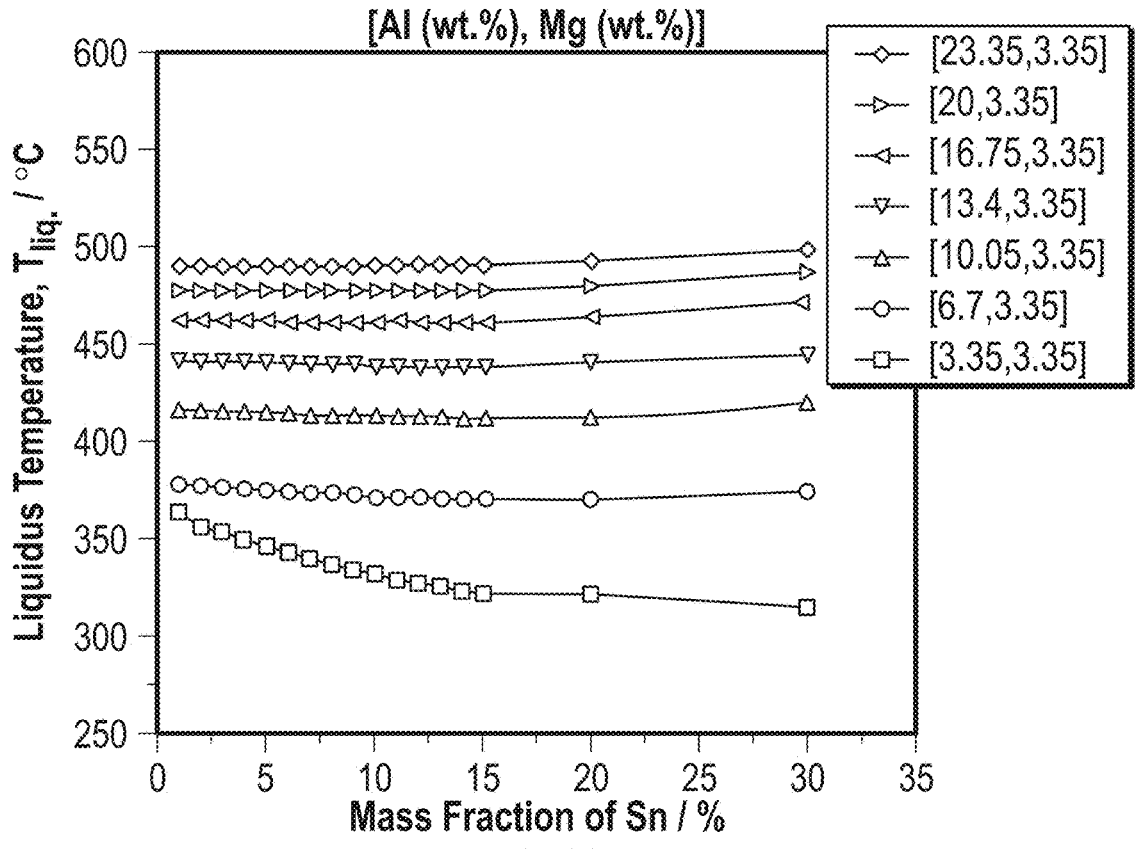
FIG. 22 illustrate liquidus temperatures for various mass fractions of tin for various weight percentage of aluminum and magnesium for a Zn—Al—Mg—Sn system.
Figure 23:
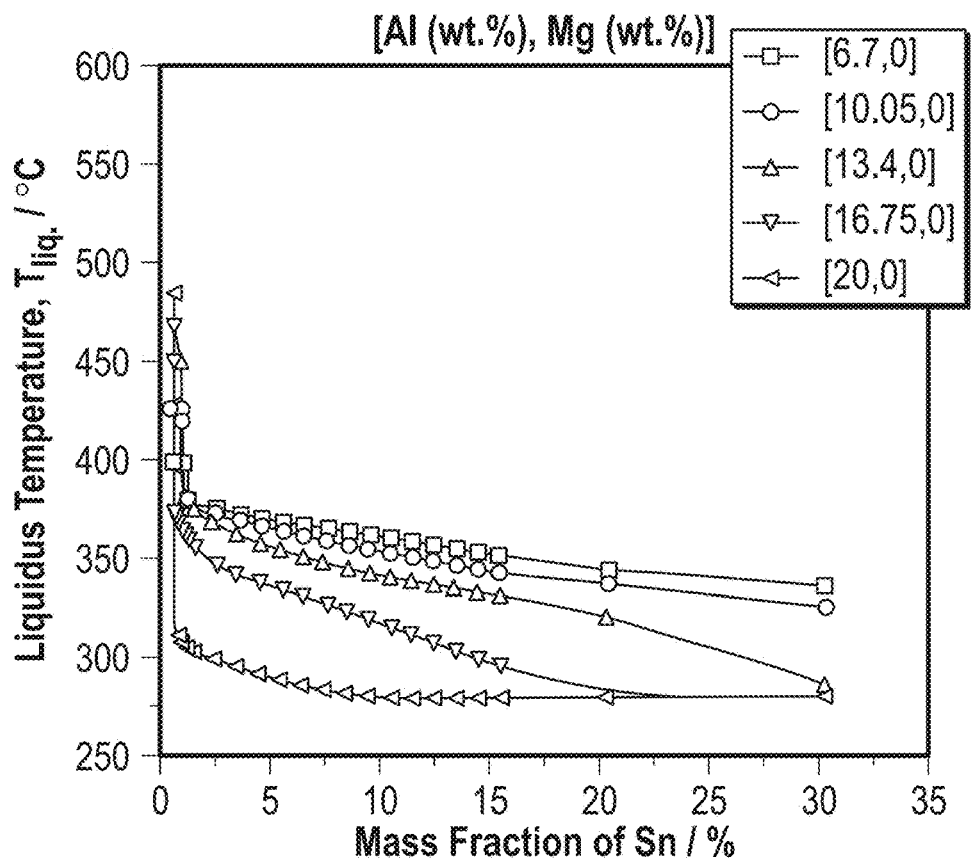
FIG. 23 illustrate liquidus temperatures for various mass fractions of tin for various weight percentages of aluminum for a Zn—Al—Sn system.

FIGS. 20-23 illustrate liquidus temperatures for various mass fractions of tin for various weight percentage of aluminum and magnesium for a Zn—Al—Mg—Sn system. For example, the connotation [0, 20] corresponds to a Zn-0Al-20Mg-xSn system. FIG. 21 illustrates liquidus temperatures for various mass fractions of tin for various weight percent of aluminum and magnesium for a Zn—Al—Mg—Sn system, where the amount of magnesium is 6.7 wt. %. FIG. 22 illustrates liquidus temperatures for various mass fractions of tin for various weight percentage of aluminum and magnesium for a Zn—Al—Mg—Sn system, where the amount of magnesium is 3.35 wt. %. FIG. 23 illustrates liquidus temperatures for various mass fractions of tin for various weight percentages of aluminum and magnesium for a Zn—Al—Sn system (i.e. magnesium is 0 wt. %).

Higher fractions of magnesium lead to higher liquid temperatures of Zn—Al—Mg—Sn alloys with the tin mass fraction ranging from about 1% to about 30% as illustrated in FIG. 20. For Zn—Al—Mg—Sn alloys with a constant Mg (6.67 wt. % illustrated in FIG. 21), increasing the fraction of aluminum can lower the liquidus temperature of alloy, so long as the alloy is not Zn-20Al-6.7Mg. FIGS. 20 and 21 indicate that tin is in favor of decreasing the liquidus temperature of an Zn—Al—Mg—Sn alloy, especially when the mass fraction of Sn is less than about 12%.

For Zn—Al—Mg—Sn alloys with a constant fraction of Mg (3.35 wt. %), decreasing the fraction of aluminum can greatly lower the liquidus temperature of the alloy as illustrated in FIG. 22. For Zn—Al—Mg—Sn alloys without magnesium, increasing the fraction of aluminum can lower the liquid temperature of the alloy as illustrated in FIG. 23.

Figure 24:
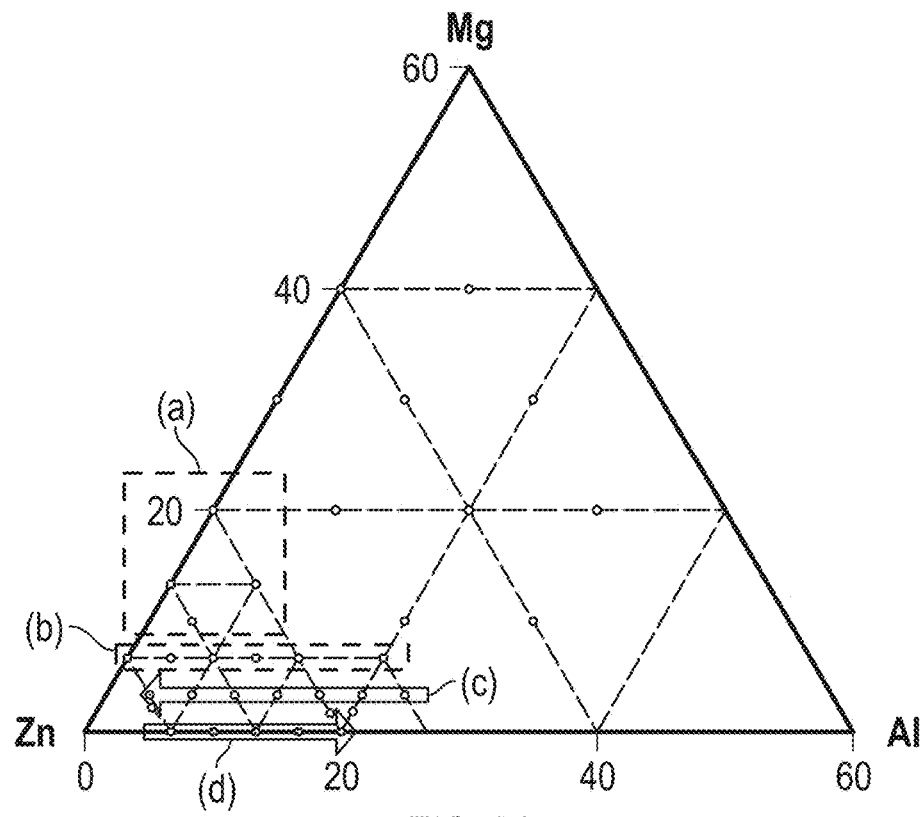
FIG. 24 illustrates the distribution of low liquidus temperatures for various conditions from FIGS. 20-23.

From FIGS. 20-23, it can be understood that the lower fraction of magnesium is in favor of decreasing the liquidus temperature of the Zn—Al—Mg—Sn alloy. FIG. 24 illustrates the distribution of low liquid temperatures for various conditions from FIGS. 20-23. Box (a) in FIG. 24 corresponds to FIG. 20; box (b) corresponds to FIG. 21; box (c) corresponds to FIG. 22 and box (d) corresponds to FIG. 23. By adding tin, the liquidus temperature of a Zn—Al—Mg—Sn can be lowered. Lower liquidus temperatures of the quaternary alloys can occur at points with less Mg or more Al, especially when considering the remaining compositions.

Figure 25:
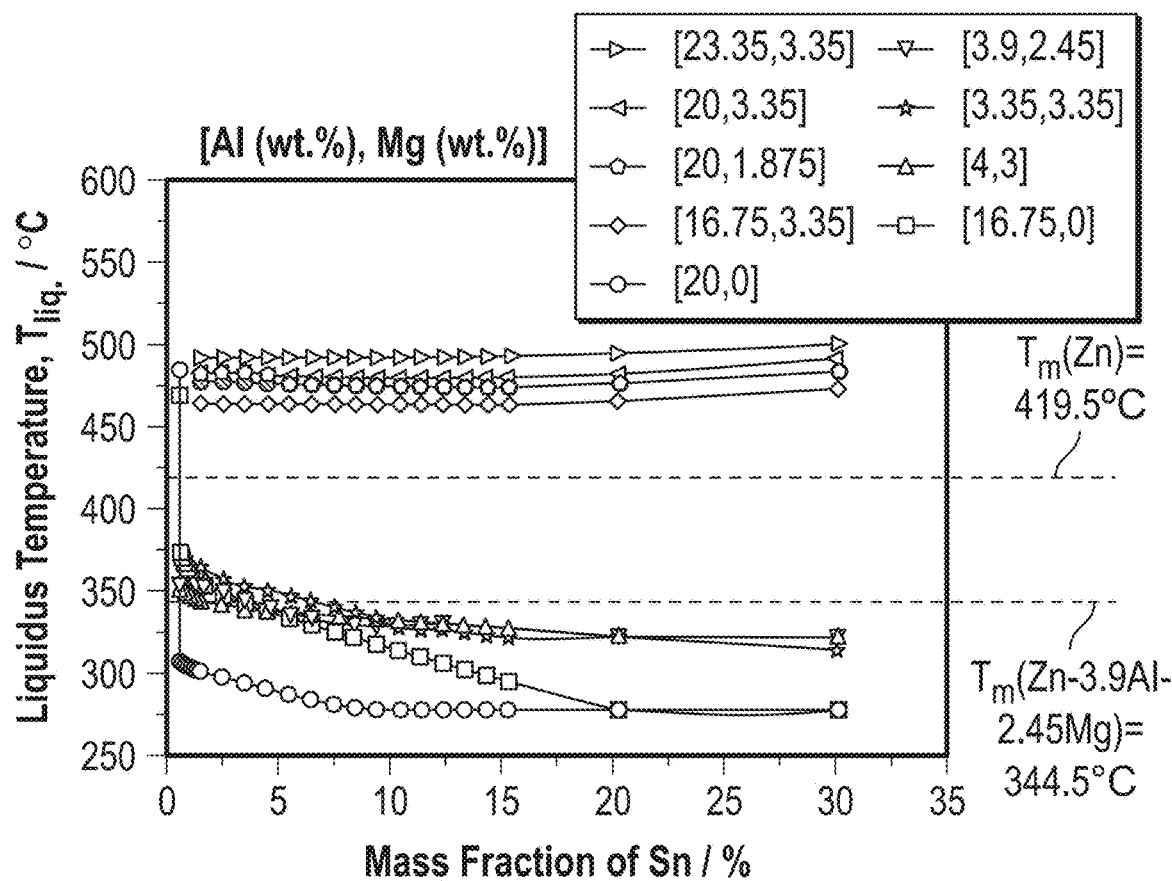
FIG. 25 illustrates liquid temperatures in Zn—Al—Mg—Sn systems for various mass fractions of tin, and various compositions of aluminum and magnesium.

FIG. 25 illustrates liquid temperatures in Zn—Al—Mg—Sn systems for various mass fractions of tin, and various compositions of aluminum and magnesium. A low liquidus temperature can be achieved when no magnesium is present in the alloy and between about 16.75 wt. % and about 20 wt. % of aluminum are included in the system.

Example 5

Figure 26:
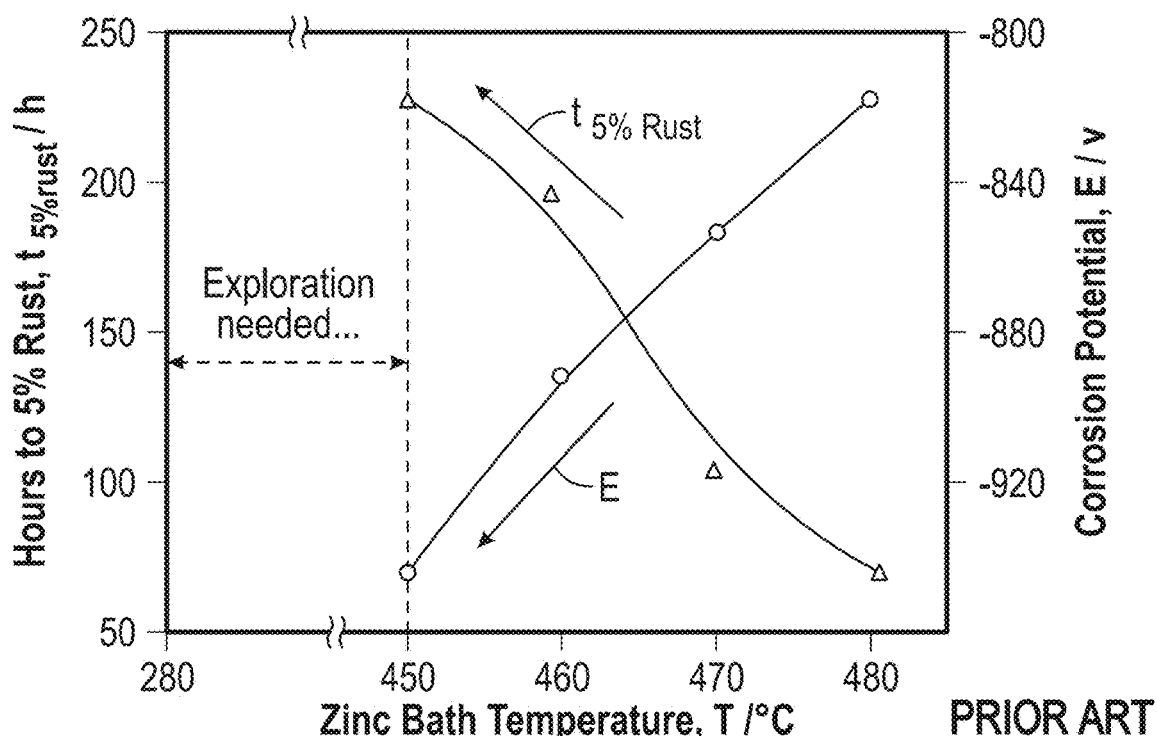
FIG. 26 illustrates corrosion resistance of some hot-dip galvanized coatings, as a function of the Zn bath temperature over a range from 450 to 480° C. from literature.
Figure 27:
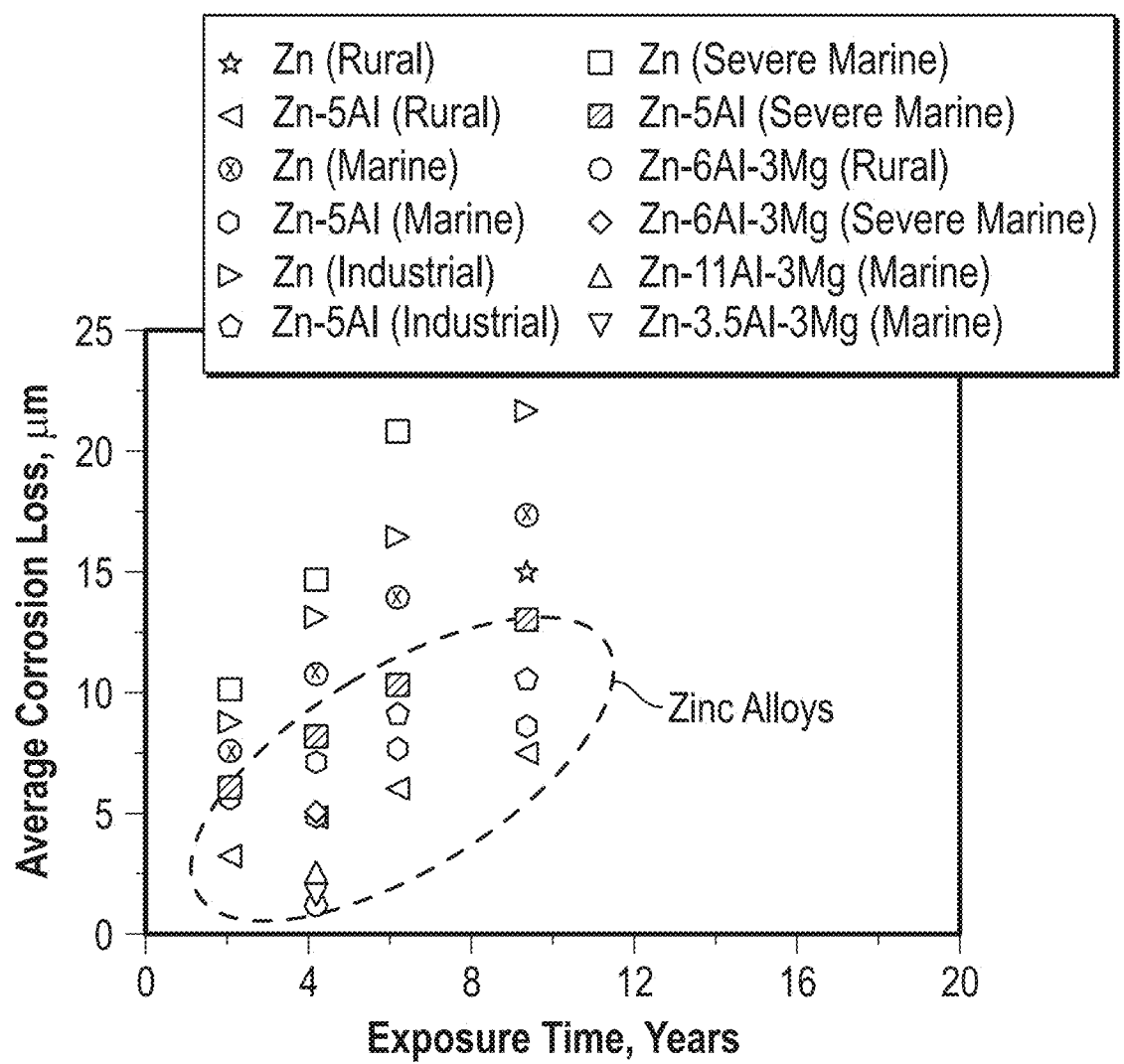
FIG. 27 summarizes the average corrosion loss of galvanized coatings in four different natural environments: rural, marine, industrial and severe marine from literature.

Corrosion resistance may be increased with the alloys of the present invention. Corrosion resistance remains a critical requirement of any galvanized coatings that are designed. FIGS. 26-27 illustrate a relationship between the operating temperature of the coating (i.e. the zinc bath temperature) and the corrosion potential and time to 5% rust. The present study confirmed the addition of specific alloy elements can significantly lower the Zn bath temperature. The influence of adding alloy elements on the corrosion resistance of galvanized coating is twofold: (1) influence of Zn bath temperature, and (2) influence of alloys. FIG. 26 (from literature—Bakhtiari, A., et al., The effect of zinc bath temperature on the morphology, texture and corrosion behavior of industrially produced hot-dip galvanized coatings. *Metall. Mater. Eng.* 20, 41-52 (2014)) illustrates the reported corrosion resistance of some hot-dip galvanized coatings, as a function of the Zn bath temperature over a range from 450 to 480° C. (note that all the coatings have the same composition). In terms of the corrosion potential (higher negative values related to increased galvanic protection) and time to 5% rust (higher values relate to improved corrosion resistance). Lower Zn bath temperature in the range examined provided enhance corrosion performance. FIG. 27 (literature—Aoki, T., et al., Results of 10-year atmospheric corrosion testing of hot dip Zn-5 mass % Al alloy coated sheet steel. *Galvatech'95*, Chicago, 1995; Shimizu, T., et al., Corrosion products of hot-dip Zn-6% Al-3% Mg coated steel subjected to atmospheric exposure. *ISIJ* 89, 166-173 (2003); Shimoda, N., et al., Atmospheric corrosion resistance of Zn-11% Al-3% Mg-0.2% Si coated steel. *Galvatech'11*, Genova, Italy, 2011; and ArcelorMitall Steel Specification, Magnelis®, 2014) summarizes the average corrosion loss of galvanized coatings in four different natural environments: rural, marine, industrial and severe marine. Compared with the performance of pure zinc coatings, the zinc alloys coatings (in this case with Al and/or Mg additions) have much lower corrosion (thickness) loss, that is, better corrosion resistance in all the natural environments over years of exposure. The results from literature suggest that addition of specific alloys can provide suitable galvanic corrosion resistance, and support the advantages of the alloys of the present invention.

Ranges have been discussed and used within the forgoing description. One skilled in the art would understand that any sub-range within the stated range would be suitable, as would any number within the broad range, without deviating from the invention.

The foregoing description of the present invention has been presented for purposes of illustration and description. Furthermore, the description is not intended to limit the invention to the form disclosed herein. Consequently, variations and modifications commensurate with the above teachings, and the skill or knowledge of the relevant art, are within the scope of the present invention. The embodiment described hereinabove is further intended to explain the best mode known for practicing the invention and to enable others skilled in the art to utilize the invention in such, or other, embodiments and with various modifications required by the particular applications or uses of the present invention. It is intended that the appended claims be construed to include alternative embodiments to the extent permitted by the prior art.

The invention claimed is:

1. A method of coating a steel or steel alloy material containing ferrite, martensite or bainite as a first microstructure at a reduced bath temperature, comprising:
    providing a steel or steel alloy material;
    simultaneously quenching and coating the steel or steel alloy material in a zinc-based alloy bath with a zinc-based alloy coating including a zinc-based alloy material and at least one dopant to form a coated steel or steel alloy material, wherein a liquidus temperature of the zinc-based alloy coating in the zinc-based alloy bath is between 275° C. and 365° C., and wherein the zinc-based alloy bath has an operating temperature that is between 0° C. and 50° C. higher than the liquidus temperature; and
    altering said first microstructure of the ferrite, martensite or bainite in the steel or steel alloy material to form an alternative microstructure by a change in at least one of martensite tempering, bainite tempering, or a lack of carbon aging when coating the steel or steel alloy material with the zinc-based coating.

2. The method of claim 1, wherein the zinc-based alloy coating is a zinc-magnesium-aluminum coating.

3. The method of claim 1, wherein the dopant is selected from the group consisting of tin, lithium, gallium, magnesium, indium, and combinations thereof.

4. The method of claim 1, wherein the liquidus temperature of the zinc-based alloy coating is between 300° C. and 365° C.

5. The method of claim 1, wherein a formula of the zinc-based alloy coating is selected from the group consisting of Zn-aAl-bMg-dopant, Zn-bMg-(x)dopant, Zn-aAl-(x)dopant, Zn-aAl-bMg-(x)dopant$_1$-(y)dopant$_2$, Zn-bMg-(x)dopant$_1$-(y)dopant$_2$, Zn-aAl-(x)dopant$_1$-(y)dopant$_2$, Zn-3.9Al-2.45Mg-(x)dopant, and Zn-3.9Al-2.45Mg-(x)dopant$_1$-(y)dopant$_2$.

6. The method of claim 5, wherein the formula of the zinc-based alloy coating is Zn-4Al-3Mg-dopant, and wherein the dopant is selected from the group consisting of tin, gallium, bismuth, and indium, and wherein a mass fraction of the dopant in the zinc-based alloy coating is between 1 and 15.

7. The method of claim 6, wherein the mass fraction of the dopant in the zinc-based alloy coating is between 1 and 9.

8. The method of claim 5, wherein the formula of the zinc-based alloy coating wherein the formula is Zn-4Al-bMg-8Sn, and wherein b is between 1 and 6.

9. The method of claim 5, wherein the formula of the zinc-based alloy coating wherein the formula is Zn-aAl-3Mg-8Sn, and wherein a is between 1 and 15.

10. The method of claim 5, wherein the formula of the zinc-based alloy coating wherein the formula is Zn-7Al-3Mg-xSn, and wherein x is between 1 and 12.

11. The method of claim 5, wherein the formula of the zinc-based alloy coating wherein the formula is Zn-15Al-1Mg-xSn, and wherein x is between 1 and 20.

12. The method of claim 5, wherein the formula of the zinc-based alloy coating wherein the formula is Zn-aAl-3Mg-10Ga, and wherein a is between 1 and 10.

13. The method of claim 5, wherein the formula of the zinc-based alloy coating wherein the formula is Zn-3.5Al-bMg-6In, and wherein b is between 1 and 4.

14. The method of claim 5, wherein the formula of the zinc-based alloy coating wherein the formula is Zn-aAl-2.5Mg-6In, and wherein a is between 1 and 6.

* * * * *